(12) United States Patent
Terada

(10) Patent No.: US 11,654,520 B2
(45) Date of Patent: May 23, 2023

(54) CUTTING APPARATUS

(71) Applicant: DISCO CORPORATION, Tokyo (JP)

(72) Inventor: Kazuki Terada, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 55 days.

(21) Appl. No.: 17/386,094

(22) Filed: Jul. 27, 2021

(65) Prior Publication Data

US 2022/0040878 A1    Feb. 10, 2022

(30) Foreign Application Priority Data

Aug. 7, 2020    (JP) .............................. JP2020-134817

(51) Int. Cl.
*B24B 53/00* (2006.01)
*B25J 15/06* (2006.01)
(Continued)

(52) U.S. Cl.
CPC ............ *B23Q 3/1554* (2013.01); *B24B 53/00* (2013.01); *B25J 15/0616* (2013.01); *B27B 5/325* (2013.01); *B23Q 3/1572* (2013.01); *B23Q 2003/155428* (2016.11); *B23Q 2003/155435* (2016.11); *Y10S 483/902* (2013.01); *Y10T 483/174* (2015.01); *Y10T 483/1755* (2015.01)

(58) Field of Classification Search
CPC ........... Y10S 483/902; Y10T 483/1733; Y10T 483/1736; Y10T 483/174; Y10T 483/1748; Y10T 483/1752; Y10T 483/1755; Y10T 483/1783; Y10T 483/1788; B23Q 3/1554; B23Q 2003/155414–155418; B23Q 2003/155425–155428; B23Q 2003/155435; B23Q 2003/155453; B24B 41/005; B24B 53/001–14; B25J 15/06–0691; B27B 5/325
USPC ...... 483/30, 31, 33, 36, 38, 39, 51, 53, 902; 451/443; 294/64.3, 183
See application file for complete search history.

(56) References Cited

U.S. PATENT DOCUMENTS 6,030,326 A * 2/2000 Azuma .............. B23Q 3/15722
                                                    483/30
6,431,949 B1 * 8/2002 Ishikawa ................. B24B 7/228
                                                    451/21

(Continued)

FOREIGN PATENT DOCUMENTS

JP       2007098536 A       4/2007
KR       100819114 B1 *     4/2008      .......... B25J 15/0616
KR       20170008672 A *    1/2017      ............. B24B 53/12

*Primary Examiner* — Erica E Cadugan
*Assistant Examiner* — Michael Vitale
(74) *Attorney, Agent, or Firm* — Greer, Burns & Crain, Ltd.

(57) ABSTRACT

There is provided a cutting apparatus that cuts a workpiece by a cutting blade. The cutting apparatus includes a chuck table that holds a board in which a groove is formed through cutting of the board by the cutting blade, a cutting unit having a spindle and a mount flange that is fixed to a tip part of the spindle and on which the cutting blade is mounted, and a replacement apparatus that replaces the cutting blade mounted on the mount flange with the cutting blade stored in a blade storing part and replaces the board placed on the chuck table with the board stored in a board storing part. The replacement apparatus includes a holding part that holds the cutting blade and the board under suction.

10 Claims, 17 Drawing Sheets

(51) Int. Cl.
  *B23Q 3/157* (2006.01)
  *B23Q 3/155* (2006.01)
  *B27B 5/32* (2006.01)

(56) References Cited

U.S. PATENT DOCUMENTS

| | | | |
|---|---|---|---|
| 7,563,155 B2* | 7/2009 | Kumagai | H01L 21/67092 |
| | | | 83/676 |
| 9,636,944 B2* | 5/2017 | Woolley | B60B 15/02 |
| 9,833,922 B2* | 12/2017 | Nitta | B26D 7/26 |
| 2018/0215010 A1* | 8/2018 | Sekiya | B24B 53/12 |
| 2019/0001526 A1* | 1/2019 | Sekiya | B28D 5/0058 |
| 2019/0061093 A1* | 2/2019 | Sekiya | B24B 27/0608 |
| 2019/0084124 A1* | 3/2019 | Sekiya | H01L 21/67092 |

\* cited by examiner

CUTTING APPARATUS

BACKGROUND OF THE INVENTION

Field of the Invention

The present invention relates to a cutting apparatus that cuts a workpiece by a cutting blade.

Description of the Related Art

By dividing a wafer on which plural devices such as an integrated circuit (IC) and large scale integration (LSI) are formed, plural device chips each including the device are manufactured. Furthermore, a package substrate is obtained by mounting the plural device chips on a predetermined substrate and then coating the mounted device chips with a sealant composed of a resin (mold resin). By dividing this package substrate, package devices including the plural device chips turned to a package are manufactured. The device chips and the package devices are mounted in various kinds of electronic equipment such as mobile phones and personal computers.

A cutting apparatus is used when the workpiece such as the above-described wafer or package substrate is divided. The cutting apparatus includes a chuck table that holds the workpiece and a cutting unit that executes cutting processing for the workpiece. The cutting unit includes a spindle and a mount flange fixed to the tip part of the spindle and an annular cutting blade that cuts the workpiece is mounted on the mount flange. The cutting blade is fixed to the mount flange by a nut. Furthermore, when the spindle is rotated in the state in which the cutting blade is mounted on the mount flange, the cutting blade rotates. By causing the cutting blade that rotates to cut into the workpiece held by the chuck table, the workpiece is cut to be divided.

The cutting blade wears through the processing of the workpiece and therefore is periodically replaced. When the cutting blade is replaced, first, a nut that fixes the cutting blade is loosened and removed, and the used cutting blade is removed from the mount flange. Thereafter, a cutting blade for replacement (unused cutting blade) is mounted on the mount flange, and the cutting blade for replacement is fixed by the nut.

When the replacement of the cutting blade is manually executed, a lot of trouble is taken. In addition, there is a possibility that the cutting blade or nut accidentally drops in the work. Thus, an attempt to automatically execute replacement of the cutting blade has been made. In Japanese Patent Laid-open No. 2007-98536, a cutting apparatus equipped with blade a replacement apparatus that automatically executes replacement of a cutting blade mounted on a cutting unit (spindle unit) is disclosed. The above-described blade replacement apparatus includes a cutting blade attachment-detachment mechanism that executes attachment and detachment of the cutting blade and a nut attachment-detachment mechanism that executes attachment and detachment of a nut for fixing the cutting blade to the cutting unit. Furthermore, the cutting blade attachment-detachment mechanism includes a first holding part (first cutting blade grasping means) that grasps a used cutting blade and a second holding part (second cutting blade grasping means) that grasps a cutting blade for replacement.

SUMMARY OF THE INVENTION

In the cutting apparatus, besides the cutting blade, boards for executing maintenance or inspection of the cutting blade are used. For example, when a workpiece is processed by the cutting blade, dressing to intentionally wear the tip part of the cutting blade is executed for the purposes of correction of the shape of the cutting blade, ensuring of the sharpness of the cutting blade, and so forth. This dressing is executed by causing the cutting blade to cut into a dressing board. Furthermore, by causing the cutting blade to cut into an inspection board to form a groove in the inspection board and measuring the shape and dimensions of this groove, check of the shape and the lower end position (cutting-in depth) of the tip part of the cutting blade is often executed.

The boards such as the above-described dressing board and inspection board are consumables cut by the cutting blade and are periodically replaced. However, although automation is being promoted regarding replacement work of the cutting blade as described above, replacement work of the board is manually executed. Thus, the replacement work of the board takes a lot of trouble. Furthermore, if replacement of the board is automatically executed, a board replacement apparatus that executes replacement of the board needs to be constructed and be mounted in a cutting apparatus in addition to the blade replacement apparatus. For this reason, it is required to ensure a wide space for installing both the blade replacement apparatus and the board replacement apparatus in the cutting apparatus. As a result, the size of the cutting apparatus increases, and the layout of constituent elements of the cutting apparatus is also limited.

The present invention is made in view of such a problem and intends to provide a cutting apparatus that can automatically replace a board.

In accordance with an aspect of the present invention, there is provided a cutting apparatus that cuts a workpiece by a cutting blade. The cutting apparatus includes a chuck table that holds a board in which a groove is formed through cutting of the board by the cutting blade, a cutting unit having a spindle and a mount flange that is fixed to a tip part of the spindle and on which the cutting blade is mounted, and a replacement apparatus that replaces the cutting blade mounted on the mount flange with the cutting blade stored in a blade storing part and replaces the board placed on the chuck table with the board stored in a board storing part. The replacement apparatus includes a holding part that holds the cutting blade and the board under suction. The holding part includes a blade suction pad that gets contact with the cutting blade or a base for fixing the cutting blade and holds the cutting blade under suction and a board support part that protrudes to the outside of the holding part relative to a tip of the blade suction pad and supports the board. The board held under suction by the holding part is supported by the board support part in a state in which the board is not in contact with the blade suction pad.

Preferably, the holding part has a suction path connected to a suction source or a gas supply path connected to a gas supply source, and the suction path or the gas supply path communicates with a surface side that faces the cutting blade or the board in the holding part. Furthermore, preferably, the replacement apparatus has two holding parts as the holding part, and one of the holding parts holds the cutting blade mounted on the mount flange or the board placed on the chuck table, and the other of the holding parts holds the cutting blade stored in the blade storing part or the board stored in the board storing part.

Moreover, preferably, the cutting blade includes an annular held portion and a cutting edge formed at an outer circumferential part of the held portion, and the holding part holds the held portion under suction through causing a negative pressure to act on the held portion. In addition, preferably, the base includes a first surface, a second surface that supports the cutting blade, and a through-hole that reaches the second surface from the first surface, and the holding part holds the base under suction through causing a negative pressure to act on the first surface and holds the cutting blade under suction through causing a negative pressure to act on the second surface through the through-hole.

The cutting apparatus according to the aspect of the present invention includes the replacement apparatus that can replace the cutting blade and the board. This makes it possible to automatically execute not only replacement of the cutting blade but also replacement of the board and replacement work of the board is made easy. Furthermore, the replacement apparatus includes the holding part that can hold the cutting blade and the board. Due to this, the mechanism that holds the cutting blade and the mechanism that holds the board do not need to be separately installed independently and increase in the size of the cutting apparatus is suppressed.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
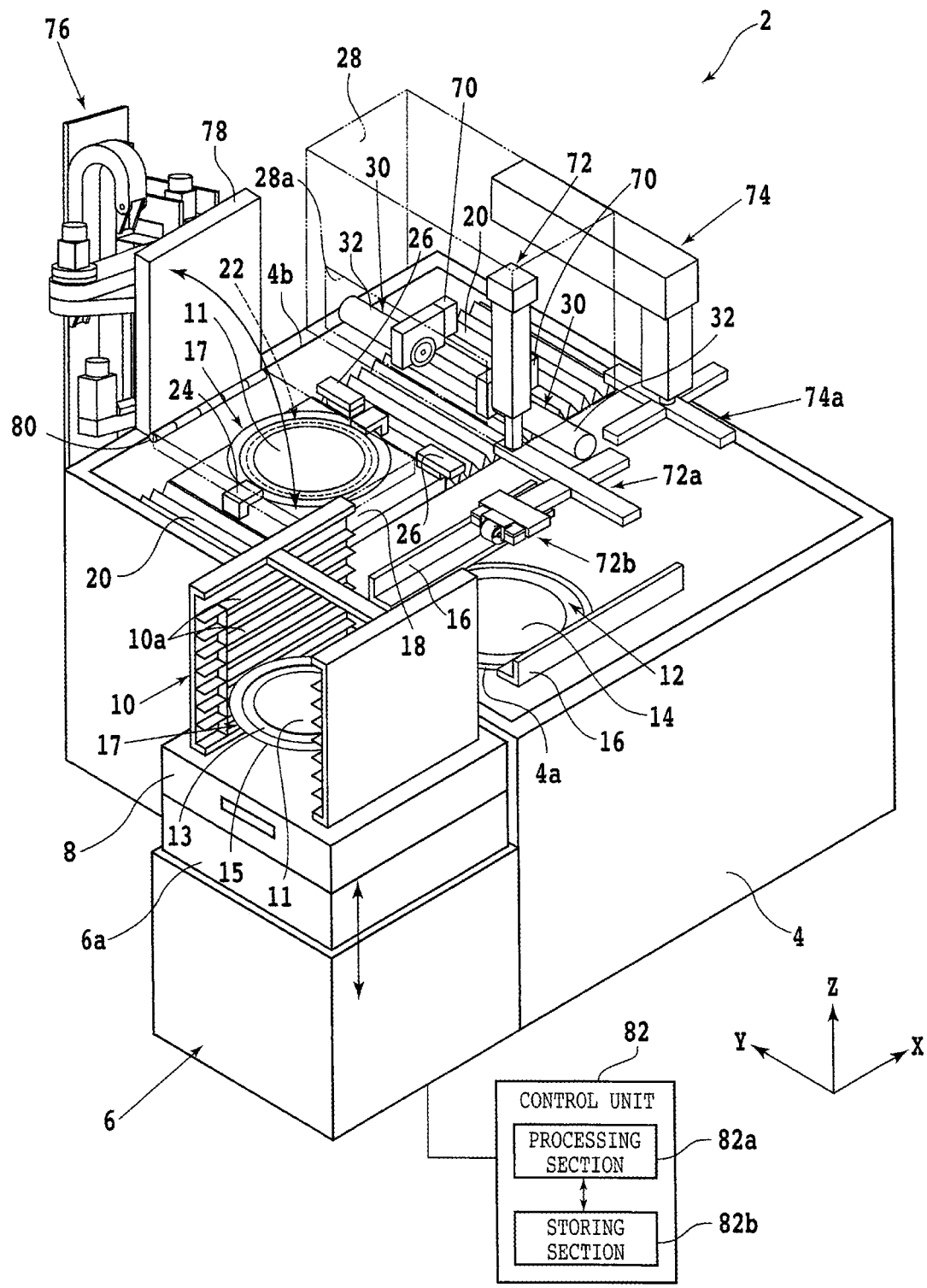
FIG. 1 is a perspective view illustrating a cutting apparatus.

An embodiment according to one aspect of the present invention will be described below with reference to the accompanying drawings. First, a configuration example of a cutting apparatus according to the present embodiment will be described. FIG. 1 is a perspective view illustrating a cutting apparatus 2. In FIG. 1, an X-axis direction (processing feed direction, first horizontal direction, front-rear direction) and a Y-axis direction (indexing feed direction, second horizontal direction, left-right direction) are directions perpendicular to each other. Furthermore, a Z-axis direction (vertical direction, upward-downward direction, height direction) is the direction perpendicular to the X-axis direction and the Y-axis direction.

The cutting apparatus 2 includes a base 4 that supports or houses the respective constituent elements that configure the cutting apparatus 2. An elevator 6 including a rising-lowering pedestal 6a is disposed at a corner part of the base 4 on the front side. The elevator 6 includes a raising-lowering mechanism (not illustrated) and raises and lowers the rising-lowering pedestal 6a along the Z-axis direction. Over the rising-lowering pedestal 6a of the elevator 6, a container 8 in which various implements (parts, consumables, and so forth) used in the cutting apparatus 2 are housed and a cassette 10 in which plural workpieces 11 that become a target of cutting processing by the cutting apparatus 2 are housed are placed. In FIG. 1, an example in which the container 8 is placed on the rising-lowering pedestal 6a and the cassette 10 is placed on the container 8 is illustrated. Details of the implements housed in the container 8 will be described later. The cassette 10 has a pair of side surfaces opposed to each other. Furthermore, plural guide rails 10a disposed at predetermined intervals along the height direction of the cassette 10 are fixed to each side surface of the cassette 10. A frame unit (workpiece unit) 17 including the workpiece 11 is supported by a pair of guide rails 10a that are fixed to both side surfaces of the cassette 10 and are disposed at the same height position.

For example, the workpiece 11 is a wafer that is composed of a semiconductor material such as silicon and has a circular disc shape. The workpiece 11 is segmented into plural regions by plural planned dividing lines (streets) arranged in a lattice manner, and a device such as an IC or LSI is formed on the front surface (upper surface) side of each of these regions. By cutting and dividing the workpiece 11 along the planned dividing lines, plural device chips each including the device are manufactured. However, there is no limit on the material, shape, structure, size, and so forth of the workpiece 11. For example, the workpiece 11 may be a wafer composed of a semiconductor other than silicon (GaAs, InP, GaN, SiC, or the like), glass, ceramic, resin, metal, or the like. Furthermore, there is no limit also on the kind, quantity, shape, structure, size, arrangement, and so forth of the devices formed on the workpiece 11, and the devices do not have to be formed on the workpiece 11. Moreover, the workpiece 11 may be a package substrate such as a chip size package (CSP) substrate or quad flat non-leaded package (QFN) substrate.

A circular tape (dicing tape) 13 with a larger diameter than the workpiece 11 is stuck to the back surface (lower surface) side of the workpiece 11. As the tape 13, a sheet having a film-shaped base formed into a circular shape and an adhesive layer (glue layer) disposed on the base, or the like, can be used. For example, the base is composed of a resin such as polyolefin, polyvinyl chloride, or polyethylene terephthalate, and the adhesive layer is composed of an epoxy-based, acrylic-based, or rubber-based adhesive or the like. Furthermore, an ultraviolet-curable resin that is cured through irradiation with ultraviolet rays may be used for the adhesive layer.

The peripheral part of the tape 13 is stuck to an annular frame 15 that is composed of a metal or the like and has a circular opening at a central part. The diameter of the opening of the frame 15 is larger than the diameter of the workpiece 11, and the workpiece 11 is disposed inside the opening of the frame 15. When the tape 13 is stuck to the workpiece 11 and the frame 15, the workpiece 11 is supported by the frame 15 through the tape 13. Due to this, the frame unit 17 is configured by including the workpiece 11, the tape 13, and the frame 15. Furthermore, one or plural frame units 17 are housed in the cassette 10.

An opening 4a is made in a region that is on the upper surface side of the base 4 and is adjacent to the elevator 6 in the X-axis direction. A cleaning unit 12 that cleans the workpiece 11 is disposed inside the opening 4a. The cleaning unit 12 includes a spinner table 14 that holds the workpiece 11 and a nozzle (not illustrated) that is disposed over the spinner table 14 and supplies a cleaning liquid such as purified water. To the spinner table 14, a rotational drive source (not illustrated) such as a motor that rotates the spinner table 14 around a rotation axis substantially parallel to the Z-axis direction is connected. In the state in which the workpiece 11 is held by the spinner table 14, the cleaning liquid is supplied from the nozzle to the workpiece 11 while the spinner table 14 is rotated. Thereby, the workpiece 11 is cleaned. It is also possible to use gas-liquid mixed fluid obtained by mixing a liquid (purified water or the like) and air, or the like, as the cleaning liquid.

A pair of guide rails 16 that hold the frame unit 17 are disposed along the X-axis direction over the cleaning unit 12. To the pair of guide rails 16, a movement mechanism (not illustrated) that moves the pair of guide rails 16 along the Y-axis direction in such a manner that the guide rails 16 get closer to or further away from each other is connected.

By clamping the frame unit 17 by the pair of guide rails 16, the position of the frame unit 17 in the Y-axis direction is adjusted.

A rectangular opening 4b is made at a position that is on the upper surface side of the base 4 and is adjacent to the guide rail 16 in the Y-axis direction. The opening 4b is formed in such a manner that the longitudinal direction thereof is along the X-axis direction. A table cover 18 with a flat plate shape is disposed inside the opening 4b. Furthermore, dust-proof and drip-proof covers 20 that can expand and contract in the X-axis direction and have a bellows shape are disposed on both sides of the table cover 18 in the X-axis direction.

A chuck table (holding table) 22 that holds the workpiece 11 or the like is disposed on the table cover 18. The upper surface of the chuck table 22 forms a flat holding surface that holds the workpiece 11 or the like. Furthermore, plural clamps 24 that grasp and fix the frame 15 or the like are disposed around the chuck table 22. For example, the chuck table 22 includes a frame body (not illustrated) that is composed of a metal such as stainless steel and has a circular column shape. Furthermore, a circular recessed part is formed on the upper surface side of the central part of the frame body and a circular-disc-shaped porous component composed of a porous material such as porous ceramic is fitted into this recessed part. The holding surface of the chuck table 22 is connected to a suction source (not illustrated) such as an ejector through the porous component, a flow path (not illustrated) made inside the chuck table 22, a valve (not illustrated), and so forth.

For example, the frame unit 17 is disposed on the chuck table 22 in such a manner that the front surface side of the workpiece 11 is exposed upward and the back surface side (side of the tape 13) of the workpiece 11 is opposed to the holding surface of the chuck table 22. Furthermore, the frame 15 is fixed by the plural clamps 24. When a negative pressure of the suction source is made to act on the holding surface of the chuck table 22 in this state, the workpiece 11 is held under suction by the chuck table 22 with the interposition of the tape 13.

Moreover, on the table cover 18, a pair of chuck tables (sub-tables) 26 are disposed adjacent to the chuck table 22. The pair of chuck tables 26 are disposed on the rear side of the chuck table 22 in the state of being separated from each other in the Y-axis direction. The upper surface of the chuck table 26 forms a flat holding surface that holds a plate-shaped component used for setup, inspection, evaluation, and so forth of cutting processing. For example, the holding surface of the chuck table 26 is formed into a rectangular shape and is connected to a suction source (not illustrated) such as an ejector through a flow path (not illustrated) made inside the chuck table 26, a valve (not illustrated), and so forth. A board 19 or 21 (see FIG. 10A) to be described later or the like is held by the chuck table 26.

A movement unit (not illustrated) and a rotational drive source (not illustrated) are disposed under the table cover 18. The movement unit is configured by a movement mechanism of a ball screw system or the like and moves the chuck table 22 and the chuck tables 26 along the X-axis direction together with the table cover 18. Furthermore, the rotational drive source is configured by a motor or the like and rotates the chuck table 22 around a rotation axis substantially parallel to the Z-axis direction.

The front side of the opening 4b (region adjacent to the opening 4a) is equivalent to a conveyance region in which carrying-in and carrying-out of the workpiece 11 are executed. Furthermore, the rear side of the opening 4b is equivalent to a processing region in which processing of the workpiece 11 is executed. By moving the chuck table 22 and the chuck tables 26 along the X-axis direction by the movement unit, the chuck table 22 and the chuck tables 26 can be positioned to the conveyance region or the processing region.

A processing chamber (cover) 28 that forms a space in which the workpiece 11 is cut is disposed over the processing region. In FIG. 1, the contours of the processing chamber 28 are illustrated by two-dot chain lines. The processing chamber 28 is formed into a rectangular parallelepiped shape by a metal or the like, for example, and is disposed to cover the processing region. Furthermore, an entry-exit port (opening) 28a through which a replacement apparatus 100 (see FIG. 6 and so forth) to be described later can pass is made in the side surface of the processing chamber 28 on the conveyance region side.

A pair of cutting units 30 that cut the workpiece 11 are disposed inside the processing chamber 28. The cutting unit 30 cuts the workpiece 11 by rotating an annular cutting blade and causing the cutting blade to cut into the workpiece 11. For example, a hub-type cutting blade 36 (see FIG. 2) is mounted on the cutting unit 30.

Figure 2:
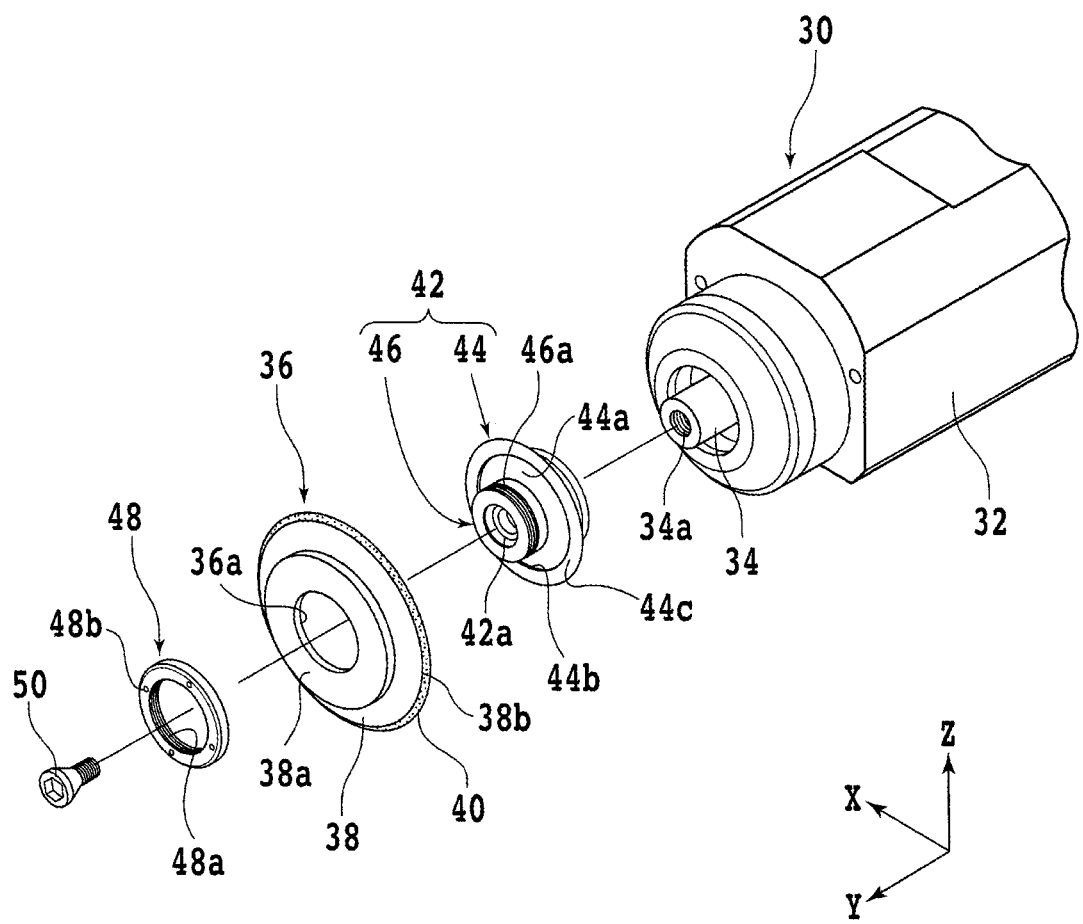
FIG. 2 is an exploded perspective view illustrating a cutting unit on which a hub-type cutting blade is mounted.

FIG. 2 is an exploded perspective view illustrating the cutting unit 30 on which the hub-type cutting blade 36 is mounted. The cutting unit 30 includes a tubular housing 32 and a circular columnar spindle 34 disposed along the Y-axis direction is housed in the housing 32. The tip part (one end side) of the spindle 34 is exposed to the external of the housing 32 and a screw hole 34a is formed at the tip part of the spindle 34. Furthermore, a rotational drive source such as a motor is connected to the base end part (the other end side) of the spindle 34. The annular cutting blade 36 is mounted on the tip part of the spindle 34. The cutting blade 36 mounted on the tip part of the spindle 34 rotates by power transmitted from the rotational drive source through the spindle 34.

The cutting blade 36 is configured through integration of an annular held portion (base) 38 composed of a metal or the like and an annular cutting edge 40 formed along the outer circumferential edge of the held portion 38. A circular opening 36a that penetrates the cutting blade 36 (held portion 38) in the thickness direction is made at the central part of the cutting blade 36. The held portion 38 has a front surface (first surface) 38a and a back surface (second surface) 38b substantially parallel to each other. The front surface 38a of the held portion 38 forms an annular held surface held at the time of attachment or detachment of the cutting blade 36. Furthermore, the cutting edge 40 is formed at the outer circumferential part of the side of the back surface 38b of the held portion 38. For example, the cutting edge 40 is configured by an electroformed abrasive stone in which abrasive grains composed of diamond or the like are fixed by a binder such as a nickel plating layer.

A mount flange 42 on which the cutting blade 36 is mounted is fixed to the tip part of the spindle 34. The mount flange 42 includes a flange part 44 that supports the cutting blade 36 and has a circular disc shape and a circular columnar boss part (support shaft) 46 that protrudes from the central part of a front surface 44a of the flange part 44. Furthermore, in the mount flange 42, a through-hole 42a that penetrates the central part of the flange part 44 and the central part of the boss part 46 is made. An annular protruding part 44b that protrudes from the front surface 44a is disposed at the outer circumferential part of the flange part 44. The tip surface of the protruding part 44b is formed substantially in parallel to the front surface 44a and forms an annular support surface 44c that supports the cutting blade 36.

A screw part 46a is formed in the outer circumferential surface of the tip part of the boss part 46, and an annular nut 48 is fastened to the screw part 46a. A circular opening 48a that penetrates the nut 48 in the thickness direction is formed at the central part of the nut 48. The opening 48a is formed to have substantially the same diameter as the boss part 46, and a screw groove corresponding to the screw part 46a of the boss part 46 is made in the opening 48a. Furthermore, in the nut 48, plural through-holes 48b that penetrate the nut 48 in the thickness direction are formed at substantially equal intervals along the circumferential direction of the nut 48.

A screw 50 is inserted into the screw hole 34a of the spindle 34 through the through-hole 42a of the mount flange 42 and is screwed to the screw hole 34a to be fastened. Thereby, the mount flange 42 is fixed to the tip part of the spindle 34. Then, when the boss part 46 is inserted into the opening 36a of the cutting blade 36, the cutting blade 36 is mounted on the mount flange 42. When the nut 48 is fastened to the screw part 46a of the boss part 46 in this state, the cutting blade 36 is clamped by the support surface 44c of the flange part 44 and the nut 48 and is fixed to the mount flange 42.

Figure 3:
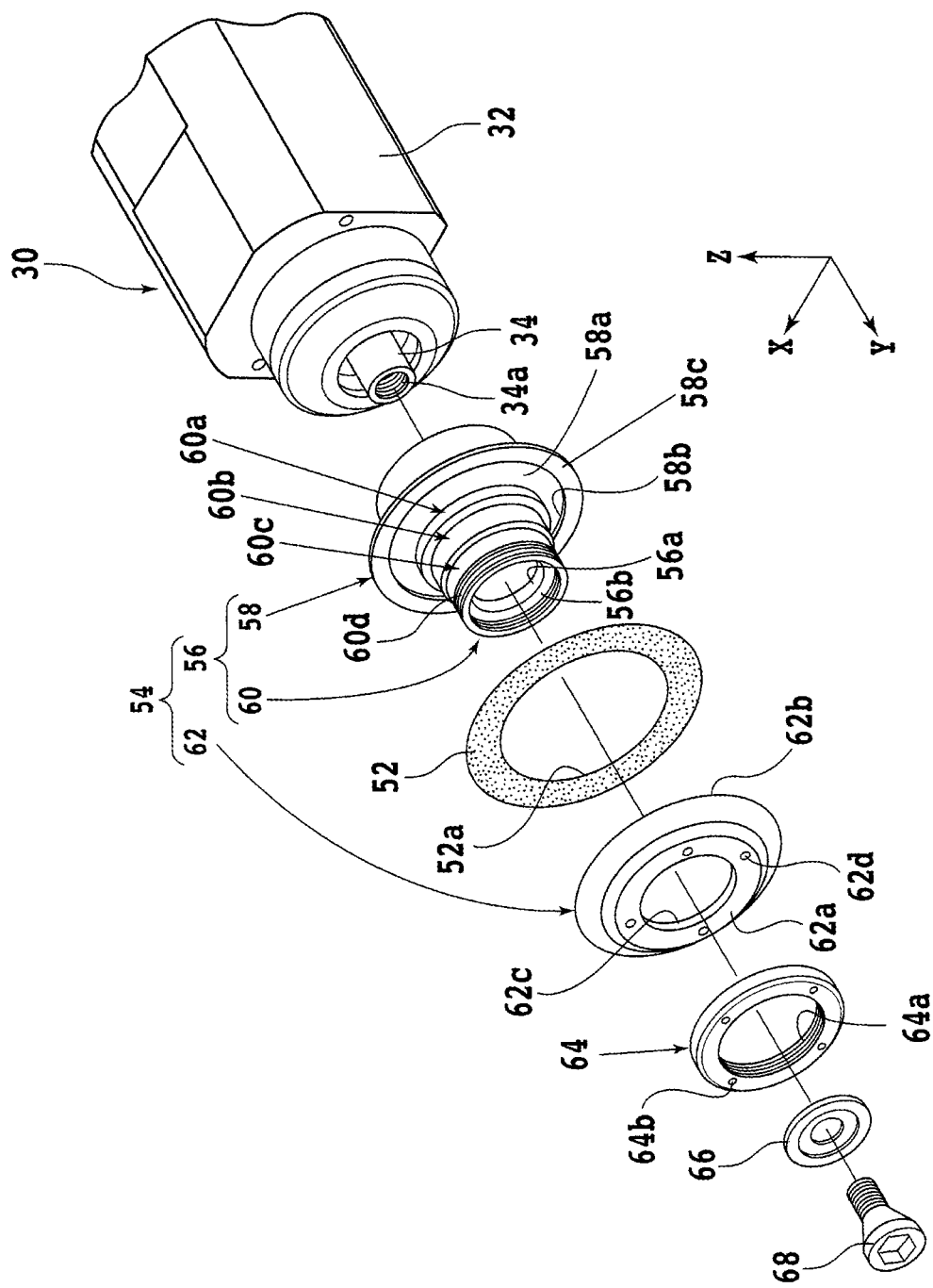
FIG. 3 is an exploded perspective view illustrating the cutting unit on which a washer-type cutting blade is mounted.

On the other hand, a washer-type cutting blade 52 (see FIG. 3) may be mounted on the cutting unit 30. FIG. 3 is an exploded perspective view illustrating the cutting unit 30 on which the washer-type cutting blade 52 is mounted. The cutting blade 52 is configured by an annular cutting edge in which abrasive grains are fixed by a binder such as a metal bond, resin bond, or vitrified bond. Furthermore, a circular opening 52a that penetrates the cutting blade 52 in the thickness direction is made at the central part of the cutting blade 52.

A mount flange 54 on which the cutting blade 52 is mounted is mounted on the tip part of the spindle 34. The mount flange 54 includes a fixed mount 56 fixed to the tip part of the spindle 34 and a base (pressing flange) 62 that fixes the cutting blade 52 mounted on the fixed mount 56.

The fixed mount 56 includes a flange part 58 that supports the cutting blade 52 and has a circular disc shape and a circular columnar boss part (support shaft) 60 that protrudes from the central part of a front surface 58a of the flange part 58. Furthermore, in the fixed mount 56, a through-hole 56a that penetrates the central part of the flange part 58 and the central part of the boss part 60 is made. An annular receiving part 56b that supports a washer 66 to be described later is disposed inside the through-hole 56a. An annular protruding part 58b that protrudes from the front surface 58a is disposed at the outer circumferential part of the flange part 58. The tip surface of the protruding part 58b is formed substantially in parallel to the front surface 58a and forms an annular support surface 58c that supports the cutting blade 52.

The boss part 60 includes an annular first boss part (first support shaft) 60a that protrudes from the front surface 58a of the flange part 58, an annular second boss part (second support shaft) 60b that protrudes from the tip of the first boss part 60a, and an annular third boss part (third support shaft) 60c that protrudes from the tip of the second boss part 60b. The diameter of the second boss part 60b is smaller than the diameter of the first boss part 60a, and the diameter of the third boss part 60c is smaller than the diameter of the second boss part 60b. Furthermore, the first boss part 60a, the second boss part 60b, and the third boss part 60c are concentrically disposed.

The base 62 for fixing the cutting blade 52 is mounted on the fixed mount 56. The base 62 is an annular component made of a metal or the like and has a front surface (first surface) 62a and a back surface (second surface) 62b substantially parallel to each other. The front surface 62a of the base 62 is equivalent to an annular held surface held at the time of attachment or detachment of the base 62. Furthermore, the back surface 62b of the base 62 is equivalent to an annular support surface that supports the cutting blade 52. A circular opening 62c that reaches the back surface 62b from the front surface 62a of the base 62 is made at the central part of the base 62. Moreover, in a region between the outer circumferential edge of the base 62 and the opening 62c, plural through-holes 62d that reach the back surface 62b from the front surface 62a of the base 62 and penetrate the base 62 are formed at substantially equal intervals along the circumferential direction of the base 62.

A screw part 60d is formed in the outer circumferential surface of the tip part of the boss part 60 of the fixed mount 56, and an annular nut 64 is fastened to the screw part 60d. A circular opening 64a that penetrates the nut 64 in the thickness direction is formed at the central part of the nut 64. The opening 64a is formed to have substantially the same diameter as the third boss part 60c and a screw groove corresponding to the screw part 60d of the boss part 60 is made in the opening 64a. Furthermore, in the nut 64, plural through-holes 64b that penetrate the nut 64 in the thickness direction are formed at substantially equal intervals along the circumferential direction of the nut 64.

The fixed mount 56 is mounted on the spindle 34 by a screw 68. Specifically, first, the washer 66 is disposed on the receiving part 56b of the fixed mount 56. In this state, the screw 68 is inserted into the screw hole 34a of the spindle 34 through the washer 66 and the through-hole 56a of the fixed mount 56 and is screwed to the screw hole 34a to be fastened. Thereby, the fixed mount 56 is fixed to the tip part of the spindle 34.

Furthermore, when the boss part 60 is sequentially inserted into the opening 52a of the cutting blade 52 and the opening 62c of the base 62, the cutting blade 52 and the base 62 are mounted on the fixed mount 56. On the side of the back surface 62b of the base 62, an annular protruding part (not illustrated) that protrudes from the back surface 62b is disposed. This protruding part is formed in such a manner that the outer circumferential surface is along the contour of the opening 52a of the cutting blade 52 and the inner wall (inner circumferential surface) is along the contour of the outer circumferential surface of the first boss part 60a. The protruding part of the base 62 is fitted into the inside of the opening 52a of the cutting blade 52. Thereby, position alignment between the base 62 and the cutting blade 52 is executed. Furthermore, the first boss part 60a is fitted into the inside of the inner wall of the protruding part of the base 62, and the second boss part 60b is fitted into the opening 62c of the base 62. When the nut 64 is fastened to the screw part 60d formed in the third boss part 60c in this state, the cutting blade 52 and the base 62 are fixed to the fixed mount 56. Thereby, the cutting blade 52 is clamped by the support surface 58c of the flange part 58 and the back surface 62b of the base 62 and is fixed to the mount flange 54.

In the above-described manner, the cutting blade 36 or the cutting blade 52 is mounted on each of the pair of cutting units 30 illustrated in FIG. 1. The cutting blades 36 or the cutting blades 52 mounted on the pair of cutting units 30 are disposed to face each other.

An imaging unit 70 that images the workpiece 11 or the like held by the chuck table 22 is mounted on each of the pair of cutting units 30. For example, the imaging unit 70 is configured by a visible light camera including an imaging element that receives visible light and converts the visible light to an electrical signal, an infrared camera including an imaging element that receives infrared and converts the infrared to an electrical signal, or the like. Position alignment between the workpiece 11 and the cutting unit 30 and so forth are executed on the basis of an image obtained by imaging by the imaging unit 70.

Moreover, a first conveying unit 72 that conveys the workpiece 11 is disposed over the base 4. A movement mechanism (not illustrated) that moves the first conveying unit 72 along the X-axis direction and the Y-axis direction is connected to the first conveying unit 72. Furthermore, the first conveying unit 72 includes an air cylinder, and a rod that rises and lowers along the Z-axis direction is incorporated in the air cylinder. A holding unit 72a that holds the frame 15 of the frame unit 17 or the like is fixed to the lower end part of the rod of the air cylinder. For example, the holding unit 72a includes plural suction pads that hold the upper surface side of the frame 15 of the frame unit 17 under suction. Moreover, at the end part of the holding unit 72a on the side of the elevator 6, a grasping mechanism 72b that grasps an end part of the frame 15 of the frame unit 17 or the like is disposed.

A second conveying unit 74 that conveys the workpiece 11 is disposed over the holding unit 72a that the first conveying unit 72 has. A movement mechanism (not illustrated) that moves the second conveying unit 74 along the Y-axis direction is connected to the second conveying unit 74. Furthermore, the second conveying unit 74 includes an air cylinder, and a rod that rises and lowers along the Z-axis direction is incorporated in the air cylinder. A holding unit 74a that holds the frame 15 of the frame unit 17 or the like is fixed to the lower end part of the rod of the air cylinder. The configuration of the holding unit 74a is similar to that of the holding unit 72a of the first conveying unit 72.

Furthermore, on a lateral side of the chuck table 22, a replacement unit 76 that executes replacement of the cutting blades 36 and 52 mounted on the cutting unit 30 and so forth is disposed. Details of the configuration of the replacement unit 76 will be described later.

A plate-shaped cover 78 is disposed at an edge part of the base 4 on the side of the replacement unit 76. One end part of the cover 78 is connected to the base 4 through a hinge 80, and the cover 78 can rotate around the hinge 80. When processing of the workpiece 11 by the cutting unit 30 is executed, the cover 78 becomes the state of standing along the Z-axis direction (opened state) as illustrated by solid lines in FIG. 1. On the other hand, when replacement of the cutting blade 36 or 52 or the like by the replacement unit 76 is executed, the cover 78 becomes the state of lying along the X-axis direction and the Y-axis direction (closed state) as illustrated by two-dot chain lines in FIG. 1.

The respective constituent elements that configure the cutting apparatus 2 (elevator 6, cleaning unit 12, guide rails 16, chuck table 22, clamps 24, chuck tables 26, cutting units 30, imaging units 70, first conveying unit 72, second conveying unit 74, replacement unit 76, and so forth) are each connected to a control unit (control part) 82. The control unit 82 generates a control signal for controlling operation of the respective constituent elements of the cutting apparatus 2 and controls running of the cutting apparatus 2. For example, the control unit 82 is configured by a computer and includes a processing section 82a that executes various kinds of processing (arithmetic operation and so forth) necessary for the running of the cutting apparatus 2 and a storing section 82*b* in which various kinds of information (data, program, and so forth) used for the processing by the processing section 82*a* are stored. The processing section 82*a* is configured to include a processor such as a central processing unit (CPU). Furthermore, the storing section 82*b* is configured to include various memories that configure a main storing device, an auxiliary storing device, and so forth.

By the above-described cutting apparatus 2, cutting processing of the workpiece 11 is executed. When the workpiece 11 is processed, first, the frame unit 17 including the workpiece 11 that becomes the target of the processing is housed in the cassette 10. Then, the cassette 10 is placed on the rising-lowering pedestal 6*a* of the elevator 6. The frame unit 17 housed in the cassette 10 is carried out from the cassette 10 by the first conveying unit 72. Specifically, the first conveying unit 72 moves along the X-axis direction in such a manner as to get further away from the cassette 10 in the state in which the first conveying unit 72 grasps an end part of the frame 15 with the grasping mechanism 72*b*. Thereby, the frame unit 17 is drawn out from the cassette 10 and is disposed on the pair of guide rails 16. Then, the frame unit 17 is clamped by the pair of guide rails 16, and position alignment of the frame unit 17 is executed.

Next, the first conveying unit 72 holds the upper surface side of the frame 15 by the holding unit 72*a* and conveys the frame unit 17 onto the chuck table 22 disposed in the conveyance region. Furthermore, the chuck table 22 moves from the conveyance region to the processing region in the state in which the chuck table 22 holds the back surface side (side of the tape 13) of the workpiece 11 under suction. Thereby, the workpiece 11 is disposed inside the processing chamber 28.

Then, position alignment between the workpiece 11 and the cutting units 30 is executed on the basis of images acquired by imaging the workpiece 11 by the imaging units 70. Thereafter, the workpiece 11 is cut by the cutting units 30. For example, the workpiece 11 is cut along planned dividing lines to be divided into plural device chips.

When the cutting processing has been completed, the chuck table 22 moves to the conveyance region. Then, the second conveying unit 74 holds the upper surface side of the frame 15 by the holding unit 74*a* and conveys the frame unit 17 from the chuck table 22 to the cleaning unit 12. Then, cleaning of the workpiece 11 is executed by the cleaning unit 12. When the cleaning of the workpiece 11 has been completed, the first conveying unit 72 holds the frame 15 by the holding unit 72*a* and conveys the frame unit 17 onto the pair of guide rails 16. Then, the frame unit 17 is clamped by the pair of guide rails 16, and position alignment of the frame unit 17 is executed. Thereafter, the first conveying unit 72 moves toward the cassette 10 in the state in which the first conveying unit 72 grasps the frame 15 with the grasping mechanism 72*b*, and houses the frame unit 17 in the cassette 10.

A program that describes the above-described series of operation of the cutting apparatus 2 is stored in the storing section 82*b* of the control unit 82. Furthermore, when an operator instructs the cutting apparatus 2 to execute processing of the workpiece 11, the processing section 82*a* reads out this program from the storing section 82*b* and executes it to sequentially generate the control signal for controlling operation of the respective constituent elements of the cutting apparatus 2.

Here, the cutting blades 36 and 52 mounted on the cutting unit 30 gradually wear through cutting the workpiece 11 and therefore are periodically replaced. In the cutting apparatus 2, the replacement of the cutting blades 36 and 52 is automatically executed by the replacement unit 76.

Figure 4:
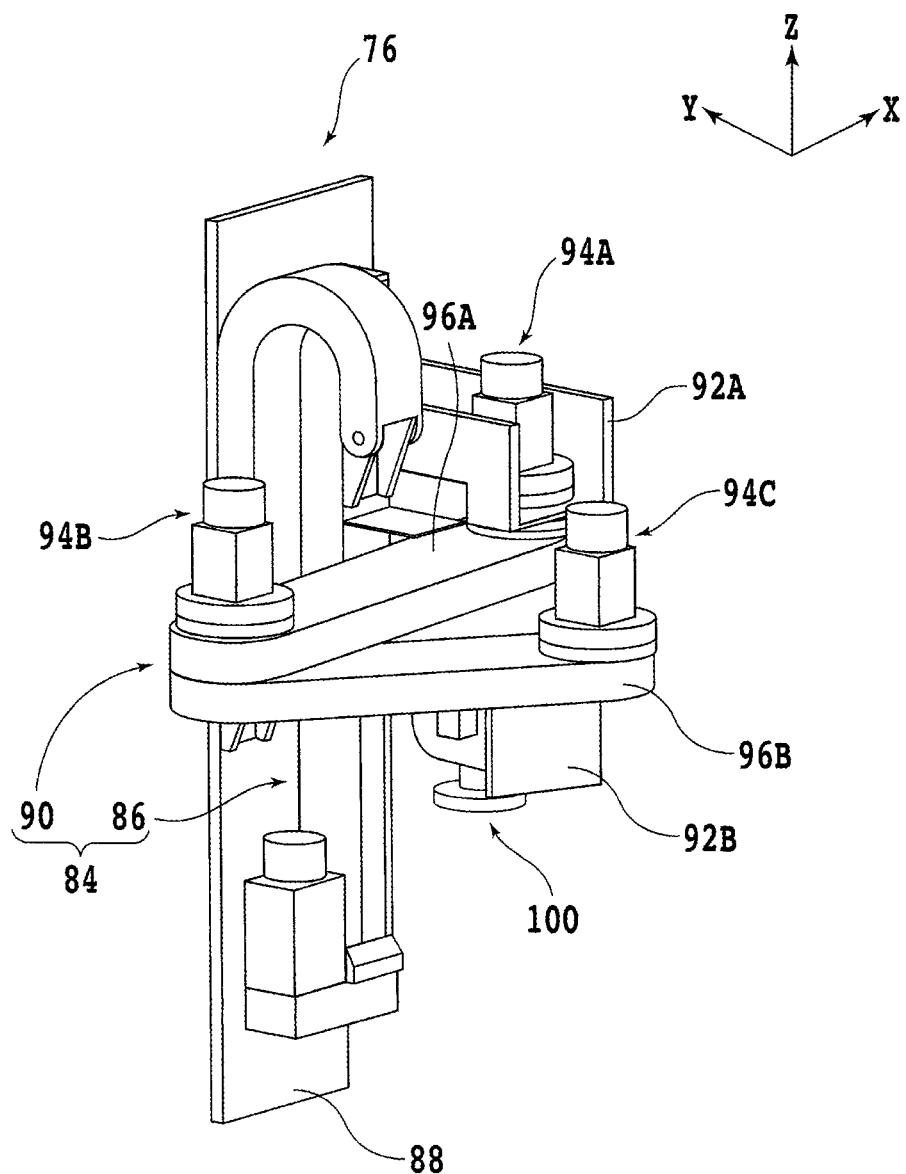
FIG. 4 is a perspective view illustrating a replacement unit.

FIG. 4 is a perspective view illustrating the replacement unit 76. The replacement unit 76 includes the replacement apparatus (replacement mechanism) 100 that executes replacement of the cutting blades 36 and 52 and a movement unit (movement mechanism) 84 that moves the replacement apparatus 100. The movement unit 84 includes a raising-lowering mechanism 86 that moves the replacement apparatus 100 along the Z-axis direction and a multi-joint arm 90 that is coupled to the raising-lowering mechanism 86 and moves the replacement apparatus 100 along the plane parallel to the X-axis direction and the Y-axis direction (horizontal plane).

The raising-lowering mechanism 86 includes a columnar base plate 88 disposed along the Z-axis direction and moves the multi-joint arm 90 in the Z-axis direction along the base plate 88. For example, the raising-lowering mechanism 86 includes a motor (not illustrated) that is disposed at the lower part of the base plate 88 and has a shaft to which a drive pulley is fixed and a driven pulley (not illustrated) disposed at the upper part of the base plate 88. One toothed endless belt (not illustrated) is wound around the drive pulley and the driven pulley and a first support 92A made of a metal is fixed to the toothed endless belt. The first support 92A rises when the shaft of the motor of the raising-lowering mechanism 86 is rotated in a first direction. The first support 92A lowers when the shaft is rotated in a second direction opposite to the first direction. Due to this, the first support 92A rises and lowers along the Z-axis direction.

However, the configuration of the raising-lowering mechanism 86 is not limited as long as the rising and lowering of the first support 92A are possible. For example, the raising-lowering mechanism 86 may be a raising-lowering mechanism of a ball screw system. The raising-lowering mechanism of a ball screw system has a pair of guide rails (not illustrated) disposed along the Z-axis direction. Furthermore, a moving plate (not illustrated) with a flat plate shape is attached to the pair of guide rails slidably along the guide rails. The first support 92A is fixed to the side of the front surface (first surface) of the moving plate. In addition, a nut part (not illustrated) is disposed on the side of the back surface (second surface) of the moving plate. This nut part is screwed to a ball screw disposed substantially in parallel to the pair of guide rails. A pulse motor (not illustrated) is coupled to one end part of the ball screw. When this pulse motor is rotated, the first support 92A rises or lowers along the Z-axis direction.

A first rotation mechanism 94A having a rotational drive source such as a motor is fixed to the first support 92A. This rotational drive source is set in such a manner that the rotation axis is disposed substantially in parallel to the Z-axis direction. To the first rotation mechanism 94A, one end part of a first arm 96A disposed along the plane parallel to the X-axis direction and the Y-axis direction is attached. A second rotation mechanism 94B is attached to the other end part of the first arm 96A. The second rotation mechanism 94B has a rotational drive source such as a motor with the rotation axis disposed substantially in parallel to the Z-axis direction. To the second rotation mechanism 94B, one end part of a second arm 96B disposed along the plane parallel to the X-axis direction and the Y-axis direction is attached. A third rotation mechanism 94C is attached to the other end part of the second arm 96B. The third rotation mechanism 94C has a rotational drive source such as a motor with the rotation axis disposed substantially in parallel to the Z-axis direction. A second support 92B made of a metal is attached to the third rotation mechanism 94C. Furthermore, the replacement apparatus 100 that executes replacement of the cutting blades 36 and 52 and so forth is mounted on the second support 92B.

Figure 5:
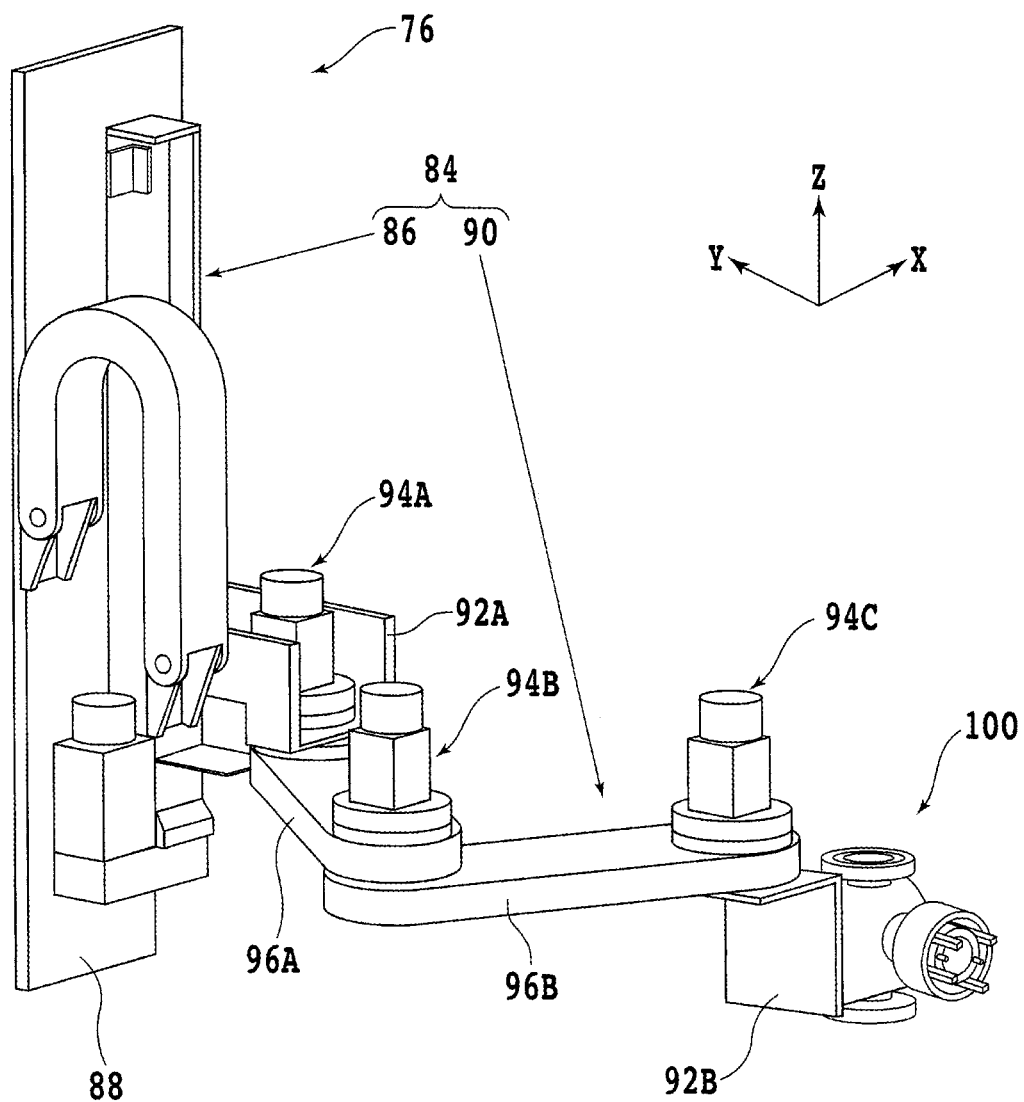
FIG. 5 is a perspective view illustrating the replacement unit in which a replacement apparatus is disposed at a replacement position.

The replacement apparatus 100 is disposed at a position adjacent to the base plate 88 (evacuation position). Furthermore, when replacement of the cutting blade 36 or 52 or the like is executed, the replacement apparatus 100 is disposed above the base 4 (replacement position) through driving of the movement unit 84. FIG. 5 is a perspective view illustrating the replacement unit 76 in which the replacement apparatus 100 is disposed at the replacement position. The replacement apparatus 100 rises and lowers along the Z-axis direction by the raising-lowering mechanism 86 and moves along the plane parallel to the X-axis direction and the Y-axis direction (horizontal plane) by the multi-joint arm 90. That is, the replacement apparatus 100 is positioned to an optional position by the raising-lowering mechanism 86 and the multi-joint arm 90.

Figure 6:
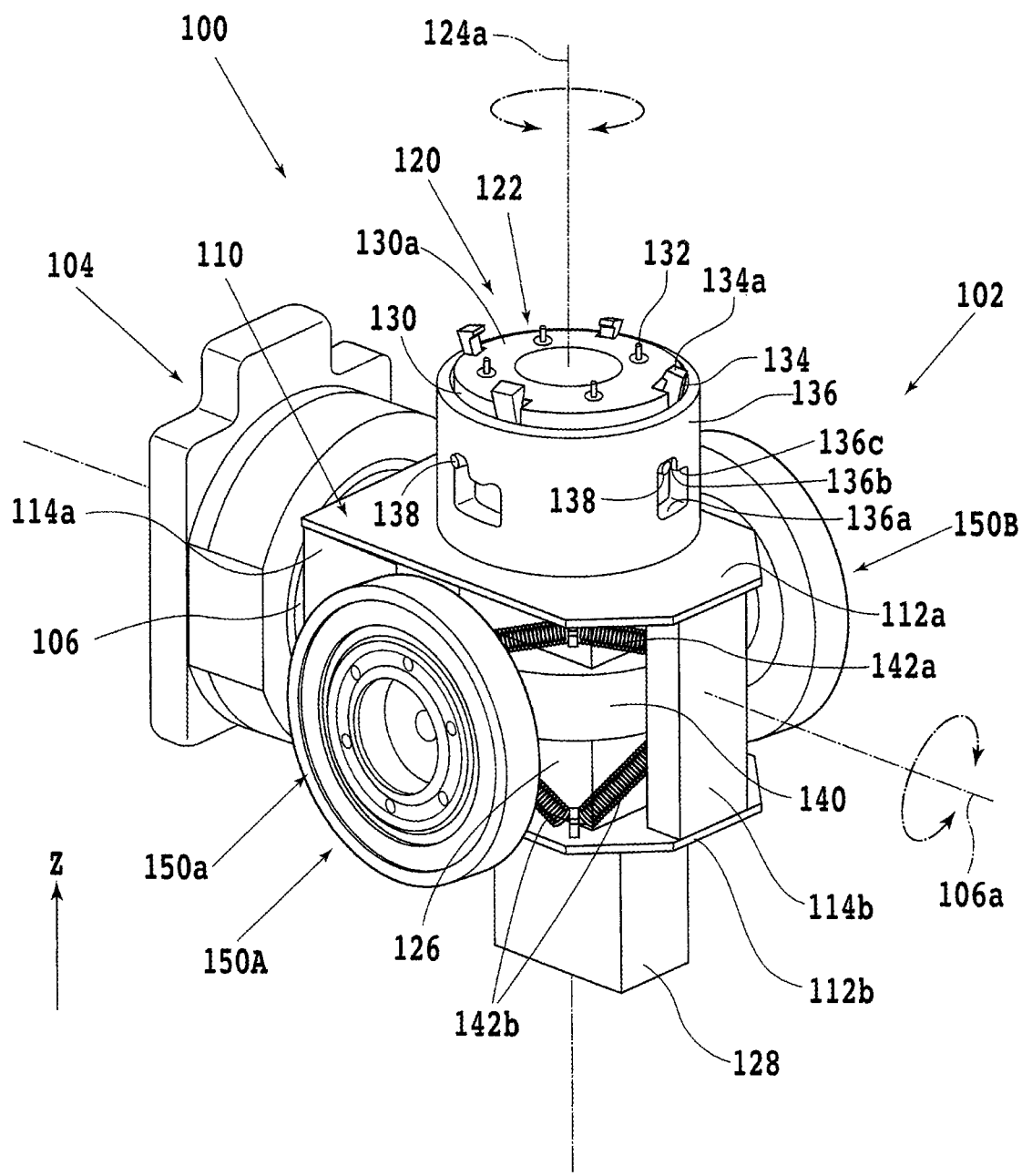
FIG. 6 is a perspective view illustrating the replacement apparatus.
Figure 7A:
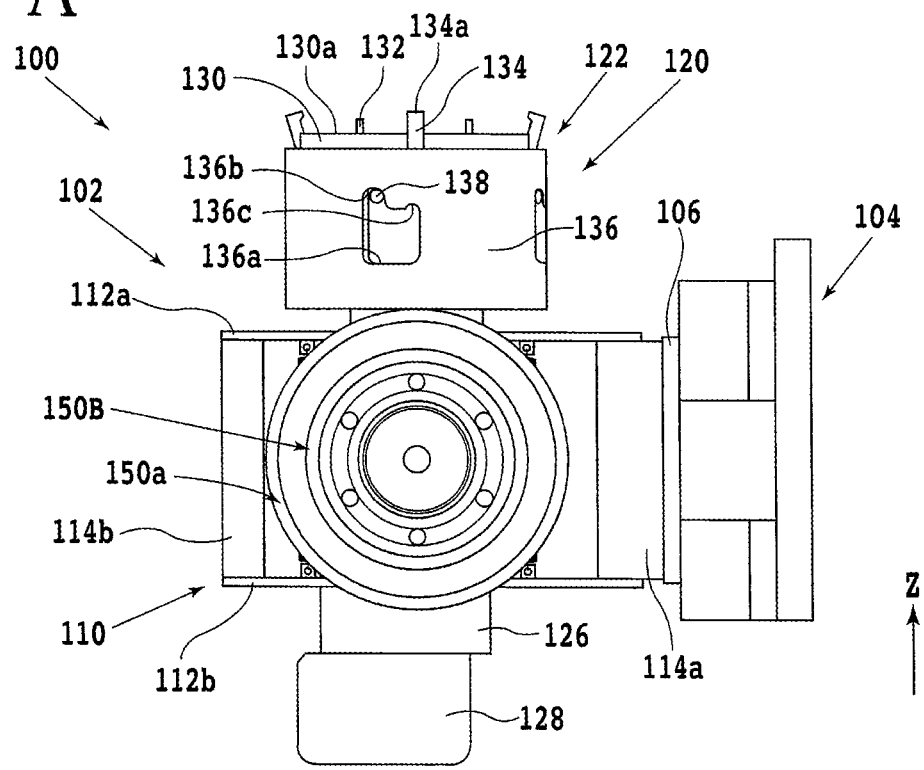
FIG. 7A is a side view illustrating the replacement apparatus.
Figure 7B:
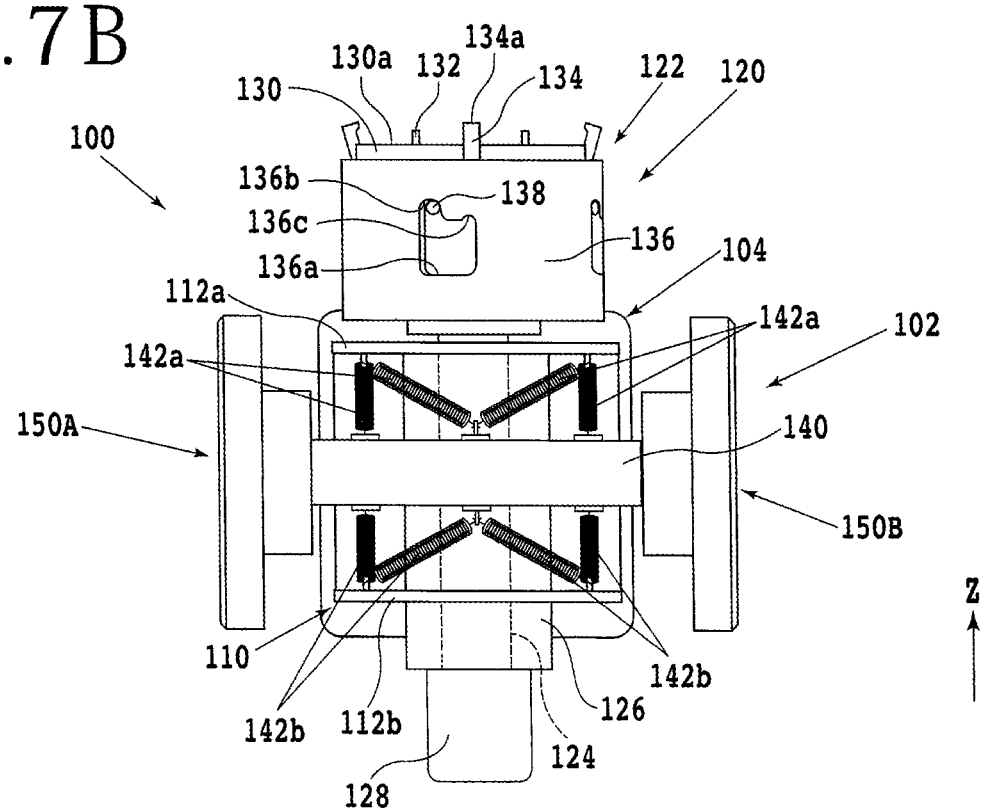
FIG. 7B is a front view illustrating the replacement apparatus.

Next, a configuration example of the replacement apparatus 100 will be described. FIG. 6 is a perspective view illustrating the replacement apparatus 100. Furthermore, FIG. 7A is a side view illustrating the replacement apparatus 100, and FIG. 7B is a front view illustrating the replacement apparatus 100. In FIG. 7B, diagrammatic representation of coupling components 114a and 114b to be described later is omitted. The configuration of the replacement apparatus 100 will be described below with reference mainly to FIG. 6.

The replacement apparatus 100 includes an attachment-detachment unit 102 that executes attachment and detachment of the cutting blades 36 and 52 and the nuts 48 and 64 (see FIG. 2 and FIG. 3). Furthermore, a rotation mechanism 104 that rotates the attachment-detachment unit 102 is coupled to the attachment-detachment unit 102.

The rotation mechanism 104 includes a rotating part (shaft) 106 coupled to the attachment-detachment unit 102 and a rotational drive source (not illustrated) such as a motor that causes the rotating part 106 to rotate (spin) with a straight line that passes through the inside of the rotating part 106 being a rotation axis 106a. The rotational drive source rotates the rotating part 106 in both directions (first direction and second direction as the opposite direction of the first direction) around the rotation axis 106a. When the rotating part 106 rotates, the attachment-detachment unit 102 coupled to the rotating part 106 rotates around the rotation axis 106a in association with the rotating part 106.

The attachment-detachment unit 102 includes a frame body 110 coupled to the rotating part 106 of the rotation mechanism 104. The frame body 110 includes a pair of plate-shaped support components 112a and 112b that are composed of a metal or the like and are disposed substantially in parallel to each other. The coupling components 114a and 114b with a rectangular parallelepiped shape are disposed between the support components 112a and 112b. The coupling component 114a is fixed to one end part of each of the support components 112a and 112b (side of the rotating part 106) and the coupling component 114b is fixed to the other end part of each of the support components 112a and 112b (opposite side to the rotating part 106). That is, the support components 112a and 112b are coupled to each other through the coupling components 114a and 114b.

On the frame body 110, a nut rotation part (nut attachment-detachment unit) 120 that holds and rotates the nut 48 or 64 (see FIG. 2 and FIG. 3) for mounting the cutting blade 36 or 52 on the cutting unit 30 is mounted. The nut rotation part 120 includes a nut holding part 122 that holds the nut 48 or 64 and a columnar rotating part (shaft) 124 (see FIG. 7B) coupled to the nut holding part 122.

The rotating part 124 is housed in a tubular housing 126. One end side (tip part) of the rotating part 124 is exposed from the housing 126, and the nut holding part 122 is connected to the one end side of the rotating part 124. Furthermore, the other end side (base end part) of the rotating part 124 is coupled to a rotational drive source 128 such as a motor that causes the rotating part 124 to rotate (spin) with a straight line that passes through the inside of the rotating part 124 being a rotation axis 124a. The rotational drive source 128 rotates the rotating part 124 in both directions (first direction and second direction as the opposite direction of the first direction) around the rotation axis 124a. When the rotating part 124 rotates, the nut holding part 122 coupled to the rotating part 124 rotates around the rotation axis 124a in association with the rotating part 124.

An opening (not illustrated) that penetrates the support component 112a in the thickness direction is made at the central part of the support component 112a, and an opening (not illustrated) that penetrates the support component 112b in the thickness direction is made at the central part of the support component 112b. Furthermore, the one end side of the rotating part 124 exposed from the housing 126 is inserted into the opening of the support component 112a and protrudes from the support component 112a toward the outside of the frame body 110. In addition, the other end side of the rotating part 124 is inserted into the opening of the support component 112b together with an end part of the housing 126 and protrudes from the support component 112b toward the outside of the frame body 110.

The one end side of the rotating part 124 is coupled to the nut holding part 122 outside the frame body 110. Furthermore, the other end side of the rotating part 124 is coupled to the rotational drive source 128 outside the frame body 110. Due to this, the frame body 110 is sandwiched by the nut holding part 122 and the rotational drive source 128, and the nut rotation part 120 is mounted on the frame body 110. Moreover, the nut rotation part 120 is disposed in such a manner that the rotation axis of the nut holding part 122 (equivalent to the rotation axis 124a) is along a direction perpendicular to the rotation axis 106a of the rotating part 106.

The nut holding part 122 includes a rotating component 130 that is fixed to the one end side of the rotating part 124 and has a circular column shape. The rotating component 130 is biased toward the opposite side to the support component 112a by a spring or the like and moves toward the support component 112a when being given an external force. Furthermore, the rotating component 130 has a front surface 130a located on the opposite side to the support component 112a. Moreover, on the rotating component 130, plural (four, in FIG. 6) holding pins 132 that protrude from the front surface 130a are disposed at substantially equal intervals along the circumferential direction of the front surface 130a. The holding pins 132 are formed corresponding to the through-holes 48b (see FIG. 2) of the nut 48 or the through-holes 64b (see FIG. 3) of the nut 64 and can be inserted into the through-holes 48b and 64b. The number, size, arrangement, and so forth of the holding pins 132 are set as appropriate according to the through-holes 48b and 64b.

Around the rotating component 130, plural (four, in FIG. 6) grasping components 134 that grasp the nut 48 or 64 are disposed at substantially equal intervals along the circumferential direction of the rotating component 130. The grasping components 134 are each formed into a column shape and the base end parts (one end side) of the grasping components 134 are fixed to the outer circumferential surface of the rotating component 130.

The tip parts (the other end side) of the grasping components 134 protrude from the front surface 130a of the rotating component 130. At this tip part, a claw part 134a that bends toward the center of the rotating component 130 is formed. Furthermore, the grasping components 134 are biased toward the outside in the radial direction of the rotating component 130 by a spring or the like, and the claw parts 134a move toward the inside in the radial direction of the rotating component 130 when an external force is given.

Moreover, a cover 136 formed into a hollow circular column shape is disposed around the rotating component 130. The cover 136 is configured to be capable of rotating around the rotation axis 124a independently of the rotating component 130 and is disposed to surround the rotating component 130 and the base end side of the plural grasping components 134. When the front surface 130a of the rotating component 130 is pressed toward the inside of the cover 136 (side of the support component 112a), the spring or the like that biases the rotating component 130 contracts, and the rotating component 130 is pushed into the inside of the cover 136 together with the plural grasping components 134.

When the rotating component 130 is pressed to be pushed into the inside of the cover 136, the tip side of the plural grasping components 134 (side of the claw part 134a) gets contact with the inner wall of the cover 136 and is pressed, and the springs or the like that bias the grasping components 134 contract. Due to this, the tip side of the plural grasping components 134 moves toward the inside in the radial direction of the rotating component 130. Then, the plural grasping components 134 become the state in which the longitudinal direction thereof is disposed along the inner wall of the cover 136 (closed state). At this time, the claw parts 134a of the grasping components 134 are disposed inside in the radial direction of the rotating component 130 relative to the outer circumferential edge of the rotating component 130, for example.

On the other hand, when the pressing to the rotating component 130 is released, the rotating component 130 moves toward the outside of the cover 136, and the state in which the tip side of the grasping components 134 is pressed by the inner wall of the cover 136 is released. Due to this, the tip side of the plural grasping components 134 moves toward the outside in the radial direction of the rotating component 130. Then, the state is made in which the tip side of the plural grasping components 134 is disposed closer to the outside in the radial direction of the rotating component 130 than in the closed state (opened state). At this time, the claw parts 134a of the grasping components 134 are disposed outside in the radial direction of the rotating component 130 relative to the outer circumferential edge of the rotating component 130, for example.

Moreover, on the outer circumferential surface of the rotating component 130, plural (for example, four) pins 138 that protrude from the outer circumferential surface of the rotating component 130 are disposed. Furthermore, in the cover 136, plural (for example, four) openings 136a that penetrate the cover 136 from the outer circumferential surface to the inner circumferential surface (inner wall) are made. In addition, the tip parts of the pins 138 are each inserted into the opening 136a.

The end part of the opening 136a located on the opposite side to the support component 112a is formed into a step shape and includes a first pin receiving part 136b and a second pin receiving part 136c. The second pin receiving part 136c is disposed at a position more separate from the front surface 130a of the rotating component 130 (closer to the side of the support component 112a) than the first pin receiving part 136b.

In the initial state, the nut holding part 122 is in the state in which the pins 138 are in contact with the first pin receiving part 136b. Then, when the rotating component 130 is pressed to be pushed into the inside of the cover 136, the pins 138 get separated from the first pin receiving part 136b. When the rotating part 124 is rotated in the first direction in this state, the pins 138 move from the side of the first pin receiving part 136b to the side of the second pin receiving part 136c. Thereafter, when the pressing of the rotating component 130 is released, the pins 138 get contact with the second pin receiving part 136c and become the state of being supported by the second pin receiving part 136c. Due to this, the state in which the rotating component 130 is pushed into the inside of the cover 136 is kept, and the plural grasping components 134 are kept at the closed state.

On the other hand, when the rotating component 130 in the state of being pushed into the inside of the cover 136 is further pressed to be pushed into the inside of the cover 136, the pins 138 get separated from the second pin receiving part 136c. When the rotating part 124 is rotated in the second direction opposite to the first direction in this state, the pins 138 move from the side of the second pin receiving part 136c to the side of the first pin receiving part 136b. Thereafter, when the pressing of the rotating component 130 is released, the pins 138 get contact with the first pin receiving part 136b and become the state of being supported by the first pin receiving part 136b. Due to this, the rotating component 130 is pushed out from the inside of the cover 136, and the plural grasping components 134 become the opened state.

The above-described nut rotation part 120 holds and rotates the nut 48 or 64. Specifically, first, the front surface 130a of the rotating component 130 gets contact with the nut 48 or 64 in such a manner that the holding pins 132 are inserted into the through-holes 48b (see FIG. 2) of the nut 48 or the through-holes 64b (see FIG. 3) of the nut 64. When the rotating component 130 is pushed into the inside of the cover 136 in this state, the plural grasping components 134 become the closed state, and the claw parts 134a get contact with the outer circumferential surface of the nut 48 or 64 to grasp the nut 48 or 64. When the rotating part 124 (see FIG. 7B) is rotated by the rotational drive source 128 in the state in which the nut 48 or 64 is held by the plural grasping components 134, the rotating component 130 coupled to the rotating part 124 rotates, and the nut 48 or 64 held by the grasping components 134 also rotates. By holding and rotating the nut 48 or 64 by the nut rotation part 120, removal and fastening of the nut 48 or 64 when the cutting blade 36 or 52 mounted on the cutting unit 30 is replaced can be automatically executed.

For example, when the nut 48 (see FIG. 2) mounted on the mount flange 42 of the cutting unit 30 is removed, first, the replacement apparatus 100 is moved by the raising-lowering mechanism 86 and the multi-joint arm 90 (see FIG. 4 and FIG. 5), and the replacement apparatus 100 is disposed inside the processing chamber 28 through the entry-exit port 28a (see FIG. 1) of the processing chamber 28. Then, the attachment-detachment unit 102 is rotated by the rotation mechanism 104, and the nut holding part 122 is made opposed to the mount flange 42. Thereafter, the nut holding part 122 is moved to the side of the mount flange 42. Thereby, the side of the front surface 130a of the rotating component 130 is pressed against the nut 48 mounted on the mount flange 42. At this time, the plural holding pins 132 that the rotating component 130 has are inserted into the through-holes 48b of the nut 48. Then, the rotating component 130 is pressed by the nut 48 to be pushed into the inside of the cover 136, and the plural grasping components 134 become the closed state. Thereby, the nut 48 is grasped by the claw parts 134a of the plural grasping components 134.

Next, the rotating part 124 (see FIG. 7B) is rotated by the rotational drive source 128, and the rotating component 130 is rotated around the rotation axis 124a in the first direction (such a direction as to loosen the nut 48). Thereby, the nut 48 grasped by the plural grasping components 134 rotates and loosens to be removed from the boss part 46 of the mount flange 42. When the rotating component 130 rotates in the first direction in the state of being pushed into the inside of the cover 136, the pins 138 move from the side of the first pin receiving part 136b to the side of the second pin receiving part 136c. Thereafter, the nut holding part 122 is moved in such a direction as to get separated from the mount flange 42. At this time, the pins 138 are supported by the second pin receiving parts 136c, and thereby the state in which the rotating component 130 is pushed into the inside of the cover 136 is kept. Due to this, the state in which the plural grasping components 134 grasp the nut 48 (closed state) is kept.

On the other hand, when the nut 48 is attached to the mount flange 42 of the cutting unit 30, first, the nut holding part 122 in the state of holding the nut 48 is made opposed to the mount flange 42, and the nut holding part 122 is moved to the side of the mount flange 42. Thereby, the nut 48 held by the nut holding part 122 is positioned to the tip part of the boss part 46 of the mount flange 42. In addition, the rotating component 130 is pushed into the inside of the cover 136.

Next, the rotating part 124 (see FIG. 7B) is rotated by the rotational drive source 128, and the rotating component 130 is rotated around the rotation axis 124a in the second direction (such a direction as to fasten the nut 48) as the opposite direction of the first direction. Thereby, the nut 48 rotates to be fastened to the screw part 46a formed in the boss part 46 of the mount flange 42 and be mounted on the mount flange 42. When the rotating component 130 rotates in the second direction in the state of being pushed into the inside of the cover 136, the pins 138 move from the side of the second pin receiving part 136c to the side of the first pin receiving part 136b. Thereafter, the nut holding part 122 is moved in such a direction as to get separated from the mount flange 42. At this time, the pins 138 are supported by the first pin receiving parts 136b. Then, the rotating component 130 is pushed out from the inside of the cover 136, and the grasping of the nut 48 by the plural grasping components 134 is released.

The method for keeping the plural grasping components 134 at the closed state or the opened state is not limited to the above description. For example, instead of disposing the pins 138 on the rotating component 130, the attachment-detachment unit 102 may be equipped with an actuator that moves the cover 136 along the height direction of the cover 136. For example, the actuator is configured by an air cylinder or the like and is fixed to the support component 112a. By moving the cover 136 by this actuator, the closed state and the opened state of the plural grasping components 134 can be freely switched.

An annular component 140 made of a metal or the like is disposed between the support components 112a and 112b. The annular component 140 is disposed in the state of being substantially parallel to the support components 112a and 112b in such a manner as to surround the housing 126 (rotating part 124) and not to get contact with the housing 126. The annular component 140 is coupled to the support component 112a through plural elastic bodies (elastic components) 142a and is coupled to the support component 112b through plural elastic bodies (elastic components) 142b. That is, the annular component 140 is suspended by the elastic bodies 142a and 142b and is held in the state of being not in contact with the support components 112a and 112b (see FIG. 7B). For example, the elastic bodies 142a and 142b are formed of expandable-contractible components such as springs or rubber. When an external force is given to the annular component 140, the annular component 140 moves or rotates in an optional direction through expansion and contraction of the elastic bodies 142a and 142b.

To the outer circumferential surface of the annular component 140, a holding part 150A (first holding part) and a holding part 150B (second holding part) that hold the cutting blade 36 or 52 are coupled. The holding parts 150A and 150B are components that are composed of a resin, metal, or the like and have a circular disc shape, and hold the cutting blade 36 or 52 on the side of a circular front surface 150a oriented toward the opposite side to the annular component 140. The holding parts 150A and 150B are disposed opposed to each other across the frame body 110 in such a manner that the front surface 150a of the holding part 150A and the front surface 150a of the holding part 150B are oriented toward the outside of the frame body 110.

The holding parts 150A and 150B are each disposed separately from the nut holding part 122 by 90° in the circumferential direction (rotation direction) of the rotating part 106 of the rotation mechanism 104. Furthermore, the nut holding part 122, the front surface 150a of the holding part 150A, and the front surface 150a of the holding part 150B are disposed to be oriented toward the opposite side to the rotation axis 106a in the state of being separate from each other around the rotation axis 106a of the rotating part 106.

Figure 8A:
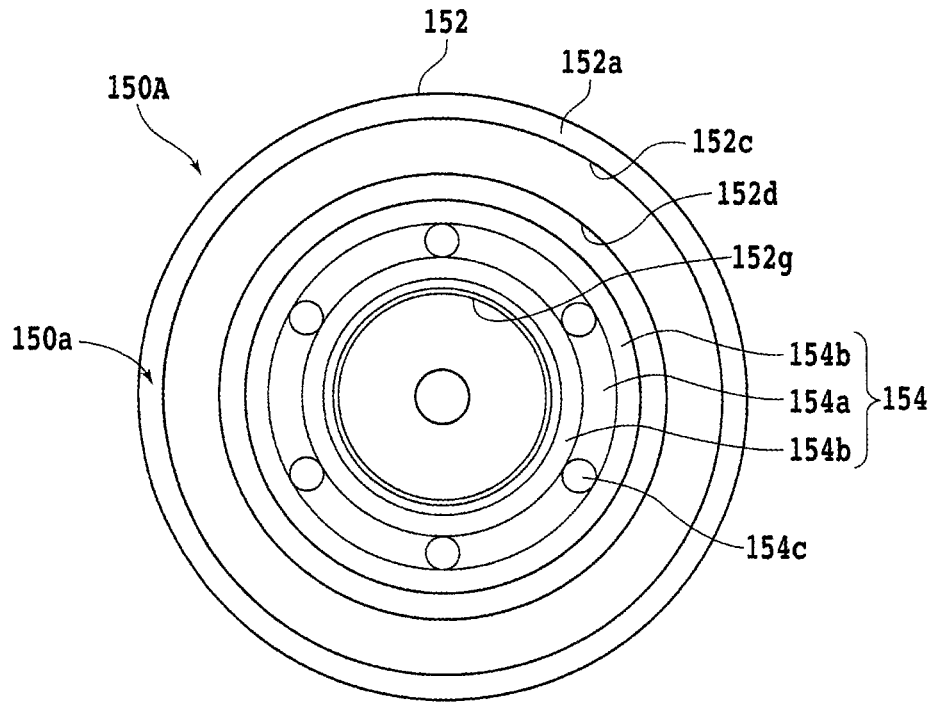
FIG. 8A is a front view illustrating a holding part.
Figure 8B:
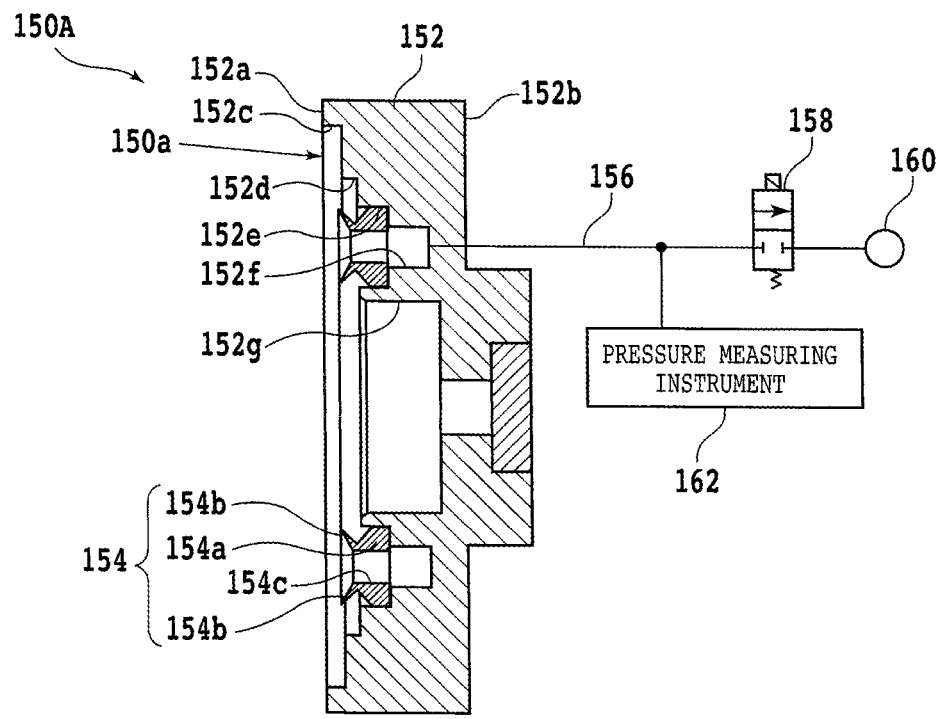
FIG. 8B is a sectional view illustrating the holding part.

Next, a configuration example of the holding parts 150A and 150B will be described. FIG. 8A is a front view illustrating the holding part 150A. FIG. 8B is a sectional view illustrating the holding part 150A. Although the configuration and functions of the holding part 150A will be described below, the configuration and functions of the holding part 150B are also the same as the holding part 150A.

The holding part 150A includes a frame body 152 that is composed of a resin, metal, or the like and has a circular disc shape. The frame body 152 has a front surface (first surface) 152a and a back surface (second surface) 152b substantially parallel to each other. The side of the front surface 152a of the frame body 152 is equivalent to the side of the front surface 150a of the holding part 150A. Furthermore, a circular first groove (first recessed part) 152c is made at the central part of the side of the front surface 152a of the frame body 152. The diameter of the first groove 152c is larger than the diameter of the front surface 38a (see FIG. 9A) of the held portion 38 of the cutting blade 36 and the diameter of the front surface 62a (see FIG. 9B) of the base 62. Moreover, a circular second groove (second recessed part) 152d is made at the central part of the bottom part of the first groove 152c. In addition, as illustrated in FIG. 8B, at the bottom part of the second groove 152d, an annular third groove (third recessed part) 152e is formed with a predetermined width along the outer circumference of the second groove 152d.

An annular blade suction pad 154 is fitted into the third groove 152e. The blade suction pad 154 is an elastic component composed of an elastic material (rubber, resin, or the like) that can be elastically deformed. The blade suction pad 154 includes a base part 154a buried into the inside of the third groove 152e and a pair of lip parts (tip parts) 154b that protrude from the base part 154a. One lip part 154b is disposed along the sidewall of the third groove 152e located outside in the radial direction of the frame body 152. Furthermore, the other lip part 154b is disposed along the sidewall of the third groove 152e located inside in the radial direction of the frame body 152. The pair of lip parts 154b are inclined with respect to the front surface 152a of the frame body 152 in such a manner as to become more separate from each other as the distance from the base part 154a becomes longer. That is, the pair of lip parts 154b are each disposed from the inside of the third groove 152e toward the outside in the width direction of the third groove 152e.

Plural through-holes 154c that penetrate the base part 154a are made in the region that overlaps with the space between the pair of lip parts 154b in the base part 154a. For example, as illustrated in FIG. 8A, six through-holes 154c are formed in the base part 154a at substantially equal intervals along the circumferential direction of the blade suction pad 154. One end side of the through-holes 154c is opened on the side of the front surface 152a of the frame body 152, and the other end side of the through-holes 154c is coupled to an annular suction path 152f made at the bottom part of the third groove 152e.

One end side of the suction path 152f is opened at the bottom of the third groove 152e and communicates with the side of the front surface 150a of the holding part 150A (side of the front surface 152a of the frame body 152) through the through-holes 154c of the blade suction pad 154. Furthermore, one end side of a flow path 156 configured by a tube, pipe, or the like is connected to the other end side of the suction path 152f.

The other end side of the flow path 156 is connected to a suction source 160 through a valve 158. For example, the valve 158 is configured by a solenoid valve in which opening and closing are electrically controlled and the suction source 160 is configured by an ejector. When the valve 158 is opened, a negative pressure (suction force) of the suction source 160 acts on the suction path 152f. Moreover, a pressure measuring instrument (pressure sensor) 162 that measures the pressure of the flow path 156 is connected to the region between the suction path 152f and the valve 158 in the flow path 156. For example, the pressure measuring instrument 162 measures the negative pressure of the inside of the flow path 156 on the basis of the gauge pressure (difference between the absolute pressure and the atmospheric pressure). The pressure value of the flow path 156 measured by the pressure measuring instrument 162 is output to the control unit 82 (see FIG. 1) and is stored in the storing section 82b.

It is also possible to use two O-rings that are different from each other in the diameter and are concentrically disposed as the blade suction pad 154. In this case, one O-ring is disposed along the sidewall of the third groove 152e located outside in the radial direction of the frame body 152, and the other O-ring is disposed along the sidewall of the third groove 152e located inside in the radial direction of the frame body 152. Furthermore, the region between the two O-rings is coupled to the suction path 152f.

The cutting blade is held by the above-described holding part 150A. Specifically, when replacement of the cutting blade is executed, the cutting blade mounted on the cutting unit 30 (used cutting blade) or the unused cutting blade (cutting blade for replacement) is held by the holding part 150A. The holding part 150A can hold both the hub-type cutting blade and the washer-type cutting blade.

Figure 9A:
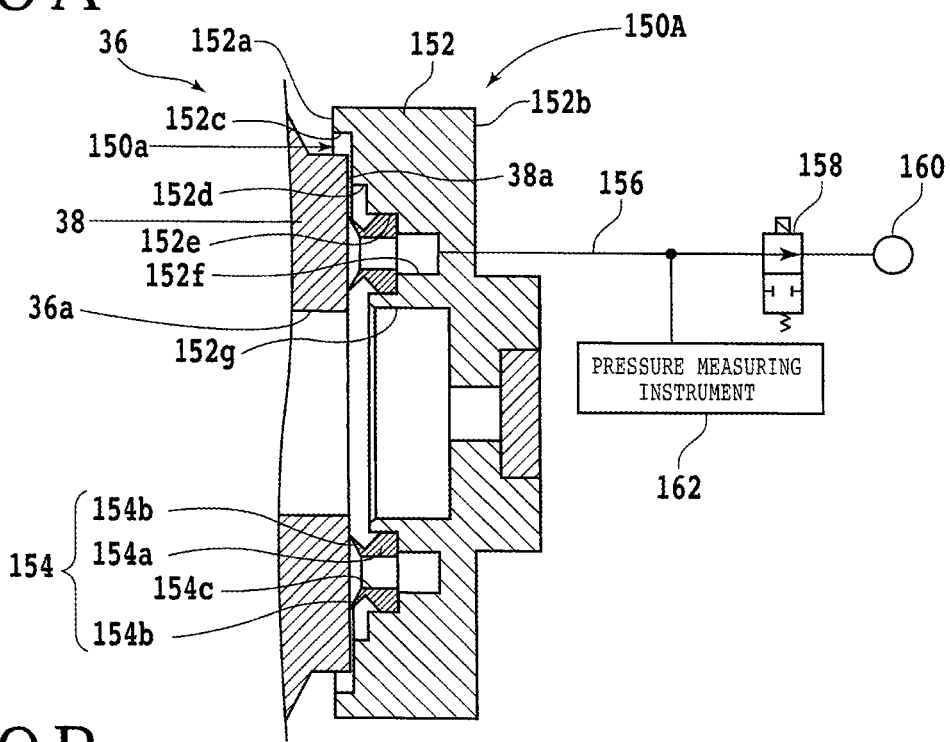
FIG. 9A is a sectional view illustrating the holding part that holds the hub-type cutting blade.

FIG. 9A is a sectional view illustrating the holding part 150A that holds the hub-type cutting blade 36. When the cutting blade 36 is held by the holding part 150A, first, the valve 158 is opened, and the negative pressure of the suction source 160 is caused to act on the suction path 152f. Then, the holding part 150A is brought close to the held portion 38 of the cutting blade 36 in the state in which the side of the front surface 150a of the holding part 150A is made opposed to the cutting blade 36. When the front surface 38a of the held portion 38 is inserted into the first groove 152c and gets contact with the tips of the pair of lip parts 154b, the space between the pair of lip parts 154b is sealed, and the pressure is reduced due to the negative pressure of the suction source 160. Due to this, the negative pressure acts on the front surface 38a of the held portion 38, and the cutting blade 36 is held under suction by the holding part 150A in the state of being in contact with the blade suction pad 154 (contact suction).

Figure 9B:
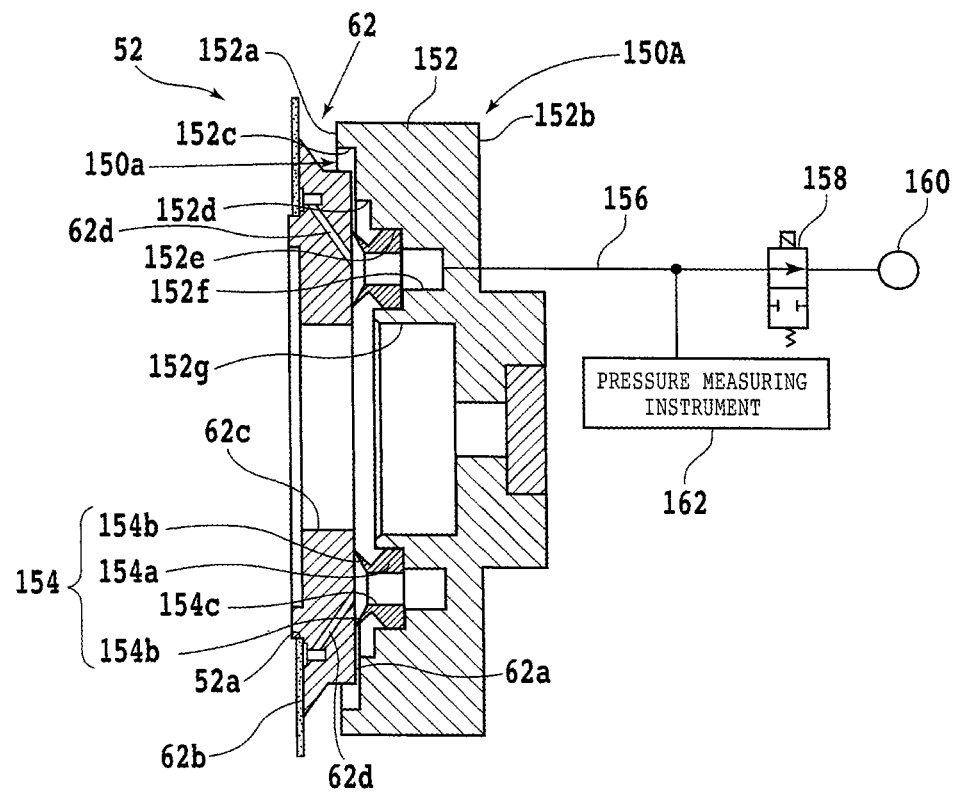
FIG. 9B is a sectional view illustrating the holding part that holds the washer-type cutting blade.

FIG. 9B is a sectional view illustrating the holding part 150A that holds the washer-type cutting blade 52. When the cutting blade 52 is held by the holding part 150A, the holding part 150A sucks the side of the front surface 62a of the base 62 and sucks the cutting blade 52 through the through-holes 62d made in the base 62. Specifically, first, the valve 158 is opened, and the negative pressure of the suction source 160 is caused to act on the suction path 152f. Then, the holding part 150A is brought close to the base 62 in the state in which the side of the front surface 150a of the holding part 150A is made opposed to the base 62 and the cutting blade 52. When the front surface 62a of the base 62 is inserted into the first groove 152c and gets contact with the tips of the pair of lip parts 154b, the space between the pair of lip parts 154b is sealed, and the pressure is reduced due to the negative pressure of the suction source 160. Due to this, the negative pressure acts on the front surface 62a of the base 62, and the base 62 is held under suction by the holding part 150A in the state of being in contact with the blade suction pad 154 (contact suction). Furthermore, in the base 62, the plural through-holes 62d that are opened in the region corresponding to the blade suction pad 154 in the front surface 62a and the region that gets contact with the cutting blade 52 in the back surface 62b are made. Moreover, the negative pressure of the suction source 160 acts also on the back surface 62b of the base 62 through the plural through-holes 62d. Due to this, the cutting blade 52 supported by the back surface 62b of the base 62 is held under suction by the holding part 150A with the interposition of the base 62.

It is also possible for the holding part 150A to hold only the base 62. Specifically, the base 62 in the state of being not in contact with the cutting blade 52 is sucked by the holding part 150A as illustrated in FIG. 9B. At this time, the negative pressure of the suction source 160 slightly leaks through the through-holes 62d of the base 62. However, the base 62 can be held by properly setting the diameter of the through-holes 62d and the suction force of the suction source 160. For example, the diameter of the through-holes 62d is set to approximately 1 mm. Thereafter, the holding part 150A in the state of holding the base 62 is moved, and the side of the front surface 150a of the holding part 150A is made opposed to the cutting blade 52 stored at a predetermined place. Then, when the holding part 150A is brought close to the cutting blade 52 and the cutting blade 52 is brought into contact with the back surface 62b of the base 62, the cutting blade 52 is held under suction by the holding part 150A with the interposition of the base 62.

The cutting blade 36 or 52 is held by the holding part 150A as described above. Whether or not the desired target object is properly held by the holding part 150A can be discriminated by measuring the pressure of the flow path 156 by the pressure measuring instrument 162.

For example, when the cutting blade 36 is held by the holding part 150A (see FIG. 9A), the suction path 152f is sealed. Thus, there is a difference between a pressure $P_{a1}$ of the flow path 156 in the state in which the holding part 150A holds the cutting blade 36 and a pressure $P_{a2}$ ($>P_{a1}$) of the flow path 156 in the state in which the holding part 150A is not in contact with the cutting blade 36. Thus, whether or not the cutting blade 36 is held by the holding part 150A can be discriminated by comparing the pressure measured by the pressure measuring instrument 162 and a threshold $P_{tha}$ ($P_{a1}<P_{tha}<P_{a2}$) set in advance.

Furthermore, in the case in which the cutting blade 52 is held by the holding part 150A (see FIG. 9B), there are differences among a pressure $P_{b1}$ of the flow path 156 in the state in which the holding part 150A holds the cutting blade 52 and the base 62 under suction, a pressure $P_{b2}$ (>pressure $P_{b1}$) of the flow path 156 in the state in which the holding part 150A holds only the base 62 under suction, and a pressure $P_{b3}$ ($>P_{b2}$) of the flow path 156 in the state in which the holding part 150A holds neither the cutting blade 52 nor the base 62. Thus, whether or not the cutting blade 52 and the base 62 are held by the holding part 150A can be discriminated by comparing the pressure measured by the pressure measuring instrument 162 and each of a threshold $P_{thb1}$ ($P_{b1}<P_{thb1}<P_{b2}$) and a threshold $P_{thb2}$ ($P_{b2}<P_{thb2}<P_{b3}$) that are set in advance.

The above-described discrimination can be executed, for example, by storing the thresholds ($P_{tha}$, $P_{thb1}$, $P_{thb2}$) in the storing section 82b of the control unit 82 (see FIG. 1) in advance and causing the processing section 82a to execute processing of comparing the pressure measured by the pressure measuring instrument 162 and the thresholds. In this case, a program in which the processing of comparing the measured pressure and the thresholds is described is stored in the storing section 82b. Furthermore, the processing section 82a executes comparison between the measured pressure and the thresholds by accessing the storing section 82b and reading out this program to execute it.

As described above, the cutting blade 36 or 52 is held by the holding part 150A. The procedure when the cutting blade 36 or 52 is held by the holding part 150B is also the same as a case of the holding part 150A. Furthermore, a fourth groove (fourth recessed part) 152g with a circular column shape is made in the region inside the suction path 152f in the side of the front surface 152a of the frame body 152. In addition, the diameter of the fourth groove 152g is set larger than the diameter of the boss part 46 (see FIG. 2) of the mount flange 42 and the diameter of the third boss part 60c (see FIG. 3) of the mount flange 54. Due to this, when the holding part 150A or 150B is brought close to the cutting unit 30, the tip part of the boss part 46 or 60 is inserted into the fourth groove 152g and contact between the holding part 150A or 150B and the boss part 46 or 60 is avoided.

Here, as illustrated in FIG. 6 and FIG. 7B, the holding parts 150A and 150B are coupled to the rotating part 106 of the rotation mechanism 104 with the interposition of the elastic bodies 142a and 142b. Due to this, the side of the front surface 150a is kept at the tiltable state in each of the holding parts 150A and 150B. That is, when an external force is given to the holding parts 150A and 150B, the front surfaces 150a can freely tilt in an optional direction. For this reason, when the above-described cutting blade 36 or base 62 gets contact with the side of the front surface 150a of the holding part 150A or 150B, the holding part 150A or 150B tilts in such a manner that the front surface 150a is disposed in parallel to the front surface 38a of the cutting blade 36 or the front surface 62a of the base 62. Due to this, the side of the front surface 150a of the holding part 150A or 150B properly gets contact with the cutting blade 36 or the base 62, and the cutting blade 36 or the base 62 is surely held under suction.

By the above-described replacement apparatus 100, replacement of the cutting blade 36 or 52 is executed. The replacement of the cutting blade 36 or 52 is executed by removing the used cutting blade 36 or 52 mounted on the cutting unit 30 and thereafter mounting the cutting blade 36 or 52 for replacement on the cutting unit 30. The cutting blades 36 and 52 for replacement are stocked in the cutting apparatus 2 in advance.

Figure 10A:
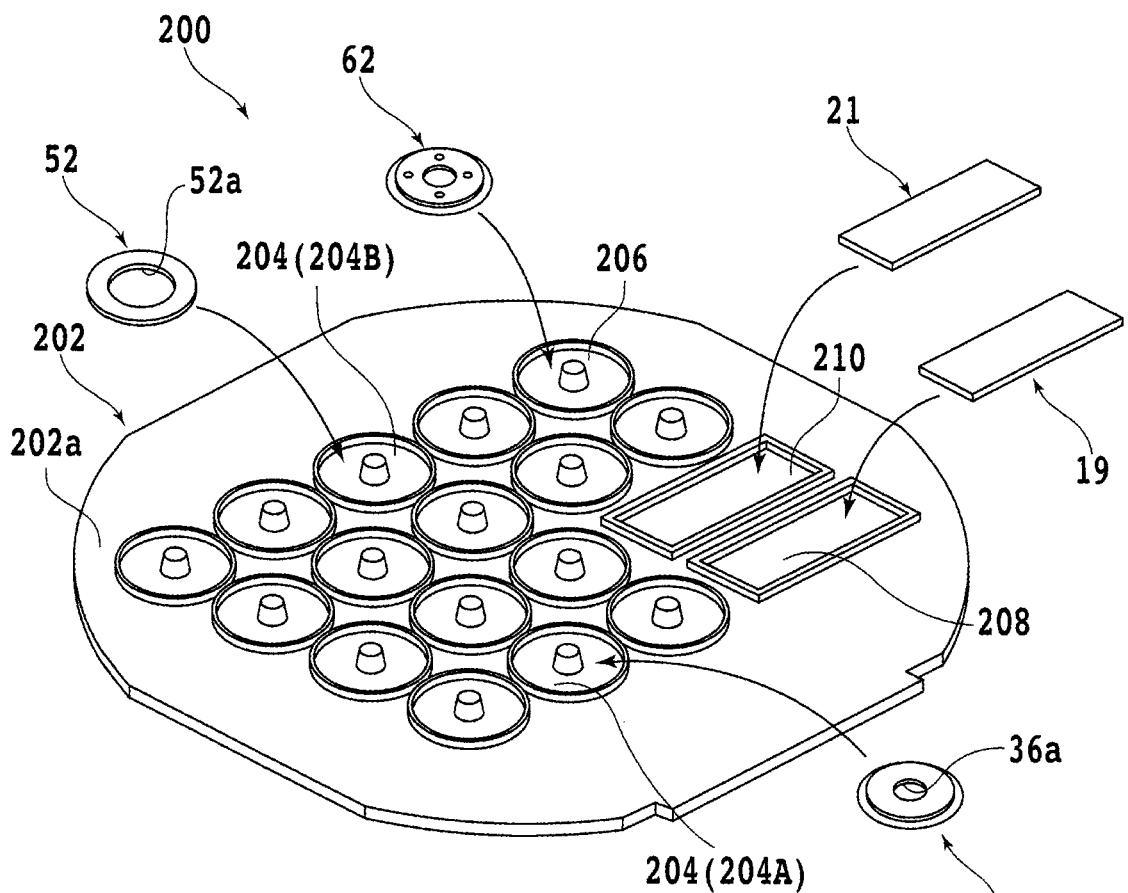
FIG. 10A is a perspective view illustrating a stock unit.

FIG. 10A is a perspective view illustrating a stock unit 200 that stores the cutting blades 36 and 52 for replacement and so forth. The stock unit 200 includes a placement part (placement base) 202 over which the cutting blades 36 and 52 and so forth are placed. For example, the placement part 202 is a plate-shaped component formed into the same shape as the frame 15 (see FIG. 1) that supports the workpiece 11, and the upper surface of the placement part 202 forms a flat placement surface 202a over which the cutting blades 36 and 52 and so forth are placed.

Plural blade storing parts 204 that store the cutting blade are disposed on the placement surface 202a of the placement part 202. For example, plural blade storing parts 204 (blade storing parts 204A) that store the hub-type cutting blade 36 and plural blade storing parts 204 (blade storing parts 204B) that store the washer-type cutting blade 52 are each disposed on the placement surface 202a.

Figure 10B:
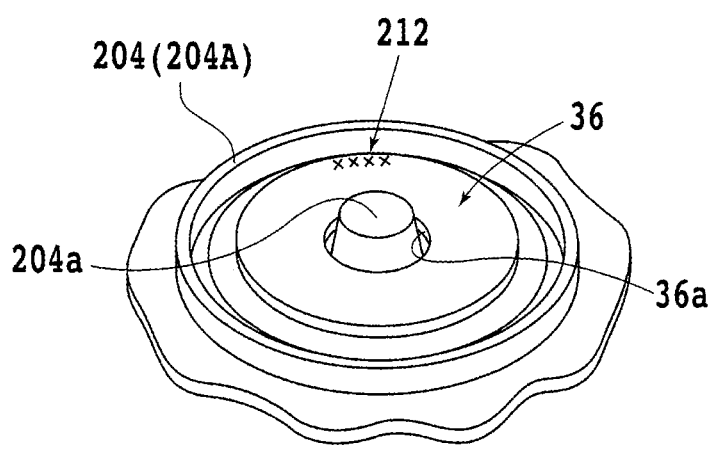
FIG. 10B is a perspective view illustrating a blade storing part.

FIG. 10B is a perspective view illustrating the blade storing part 204. For example, the blade storing part 204 is configured by a case (blade case) made of plastic in which the cutting blade 36 or 52 is housed, and is fixed onto the placement surface 202a of the placement part 202. In FIG. 10B, as one example, the blade storing part 204A (blade case) including a circular bottom surface and an annular sidewall that protrudes from the peripheral part of the bottom surface in the direction perpendicular to the bottom surface is illustrated. A columnar protruding part 204a that protrudes from the bottom surface is disposed at the central part of the blade storing part 204A. When the cutting blade 36 is stored by the blade storing part 204A, the cutting blade 36 is disposed in the blade storing part 204A in such a manner that the protruding part 204a is inserted into the opening 36a of the cutting blade 36. Similarly, when the cutting blade 52 is stored by the blade storing part 204B, the cutting blade 52 is disposed in the blade storing part 204B in such a manner that the protruding part 204a is inserted into the opening 52a of the cutting blade 52.

Furthermore, a base storing part (pressing flange storing part) 206 that stores the base 62 is disposed on the placement surface 202a of the placement part 202. The base storing part 206 is configured similarly to the blade storing part 204 and the base 62 is housed in the base storing part 206.

Moreover, implements other than the parts used for replacement of the cutting blades 36 and 52 may be stored in the placement part 202. For example, on the placement surface 202a of the placement part 202, a board storing part (dressing board storing part) 208 that stores a plate-shaped board (dressing board) 19 used for dressing of the cutting blades 36 and 52 and a board storing part (inspection board storing part) 210 that stores a plate-shaped board (inspection board) 21 used for inspection of the cutting blades 36 and 52 are disposed.

When the workpiece 11 is processed by the cutting blade 36 or 52, dressing to intentionally wear the tip part of the cutting blade 36 or 52 is executed for the purposes of correction of the shape of the cutting blade 36 or 52, ensuring of the sharpness of the cutting blade 36 or 52, and so forth. This dressing is executed by causing the cutting blade 36 or 52 to cut into the board 19 and forming a linear groove in the board 19. For example, the board 19 is formed by fixing abrasive grains composed of green carborundum (GC), white alundum (WA), or the like by a binder such as a resin bond or vitrified bond. When the dressing is executed, the binder of the cutting blade 36 or 52 gets contact with the board 19 and wears, so that the shape of the cutting blade 36 or 52 is adjusted to a shape concentric with the spindle 34 (roundness generation). In addition, abrasive grains are moderately exposed from the binder (blade sharpening). By using the cutting blade 36 or 52 for which the dressing has been executed in this manner, the accuracy of the processing of the workpiece 11 is improved.

Furthermore, when the workpiece 11 is processed by the cutting blade 36 or 52, the cutting blade 36 or 52 is caused to cut into the board 21 and inspection of the shape or correction of the position regarding the cutting blade 36 or 52 is executed in some cases. For example, whether or not the tip part of the cutting blade 36 or 52 has a desired shape is inspected by causing the cutting blade 36 or 52 to cut into the board 21 and observing a groove formed in the board 21. Moreover, on the basis of the length of the groove formed in the board 21, the position of the lower end of the cutting blade 36 or 52 (cutting-in depth) is calculated and the height position of the cutting blade 36 or 52 is adjusted. As the board 21, a plate-shaped component composed of silicon (silicon board) is used, for example. However, the material of the board 21 is not limited as long as the board 21 can be cut by the cutting blades 36 and 52. Examples of the material of the board 21 are the same as the workpiece 11.

The cutting of the board 19 or 21 by the cutting blade 36 or 52 is executed in the state in which the boards 19 or 21 are held by the pair of chuck tables 26 (see FIG. 1). At this time, the board 19 or the board 21 to be cut by the cutting blade 36 or 52 mounted on one cutting unit 30 is held by one chuck table 26, and the board 19 or the board 21 to be cut by the cutting blade 36 or 52 mounted on the other cutting unit 30 is held by the other chuck table 26. That is, the pair of chuck tables 26 are installed corresponding to the pair of cutting units 30. However, the cutting of the board 19 or 21 by the cutting blade 36 or 52 may be executed in the state in which the board 19 or 21 is held by the chuck table 22 (see FIG. 1). In this case, for example, the board 19 or 21 is supported by the frame 15 through the tape 13 similarly to the workpiece 11. Furthermore, the board 19 or 21 is held under suction by the chuck table 22 with the interposition of the tape 13.

Various implements stocked over the placement part 202 may be given an identification mark including information relating to the implement. For example, the cutting blade 36 illustrated in FIG. 10B is given an identification mark 212 of the cutting blade 36. As examples of the identification mark 212, barcode and two-dimensional code are cited. The identification mark 212 may be printed directly on the cutting blade 36 or a sticker on which the identification mark 212 is printed may be stuck to the cutting blade 36. For example, in the identification mark given to the cutting blade 36 or 52, pieces of information on the cutting blade 36 or 52, such as the kind (hub type or washer type), the outer diameter, the inner diameter, the thickness, the material and grain size of the abrasive grains, the material of the binder, and the serial number, are included. Furthermore, in the identification mark given to the board 19, pieces of information on the board 19, such as the size, the shape, the material and grain size of the abrasive grains, the material of the binder, and the serial number, are included. Moreover, in the identification mark given to the board 21, pieces of information on the board 21, such as the size, the shape, the material, and the serial number, are included.

The identification marks given to the cutting blades 36 and 52 and so forth are read by a reading unit included in the cutting apparatus 2. The reading unit is selected as appropriate according to the kind of identification mark. For example, a camera, barcode reader, or the like is used. For example, the imaging unit 70 (see FIG. 1) disposed adjacent to the cutting unit 30 functions also as the reading unit and the identification mark is read by the imaging unit 70. However, the reading unit may be disposed in the cutting apparatus 2 independently of the imaging unit 70 separately.

The information read by the reading unit is input to the control unit 82 (see FIG. 1) and is stored in the storing section 82b. Then, when replacement of the cutting blade 36 or 52 or the like is executed, the control unit 82 identifies the target object to be held by the replacement unit 76 with reference to the information stored in the storing section 82b.

The above-described stock unit 200 is housed in the container 8 (see FIG. 1) disposed in the cutting apparatus 2. Furthermore, the stock unit 200 is drawn out from the container 8 by the first conveying unit 72 and is conveyed onto the cover 78 in the closed state, for example. An openable-closable door (not illustrated) is disposed at the part of the container 8 on the side of the cleaning unit 12. When the stock unit 200 is taken out from the container 8, the elevator 6 rises and lowers to adjust the height position of the container 8 to the height position of the pair of guide rails 16. Furthermore, the shape of the placement part 202 of the stock unit 200 corresponds to the shape of the frame 15 that supports the workpiece 11. Thus, the stock unit 200 can be conveyed onto the cover 78 in the closed state by operation similar to that when the frame unit 17 is conveyed onto the chuck table 22. The disposing place of the stock unit 200 is not limited to on the cover 78. For example, the stock unit 200 may be disposed on the pair of guide rails 16. Furthermore, it is also possible to omit the installation of the cover 78 and dispose the stock unit 200 on the chuck table 22.

Next, a specific example of a blade replacement method for replacing the cutting blades 36 and 52 mounted on the cutting unit 30 of the cutting apparatus 2 will be described. In the following, as one example, a replacement method of the cutting blade 36 (see FIG. 2) mounted on the mount flange 42 will be described.

First, the cutting blade 36 for replacement is placed over the placement surface 202a of the placement part 202 included in the stock unit 200 (preparation step). Specifically, the cutting blade 36 for replacement (unused cutting blade 36) is housed in each of the plural blade storing parts 204A fixed onto the placement surface 202a of the placement part 202. The stock unit 200 restocked with the cutting blades 36 for replacement is housed in the container 8 (see FIG. 1). Then, the stock unit 200 is drawn out from the container 8 by the first conveying unit 72 and is conveyed onto the cover 78 in the closed state. Thereby, the cutting blades 36 for replacement are held by the cover 78. As described above, the stock unit 200 may be disposed on the pair of guide rails 16 or on the chuck table 22.

Figure 11A:
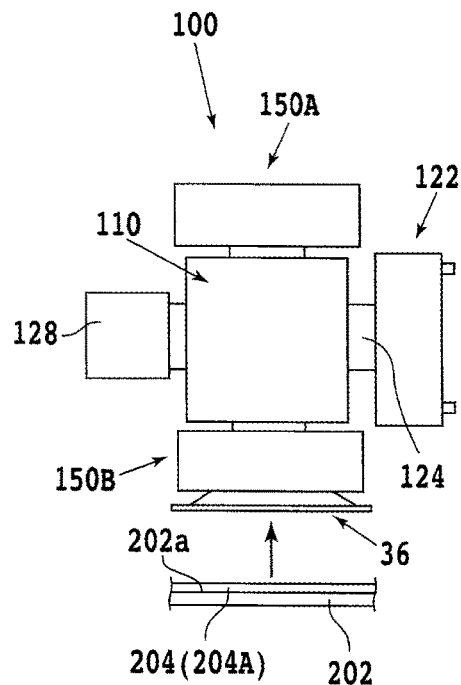
FIG. 11A is a schematic diagram illustrating the replacement apparatus in a cutting-blade-for-replacement holding step.

Next, the cutting blade 36 for replacement placed over the placement surface 202a of the placement part 202 is held by the holding part 150B of the replacement apparatus 100 (cutting-blade-for-replacement holding step). FIG. 11A is a schematic diagram illustrating the replacement apparatus 100 in the cutting-blade-for-replacement holding step. In the cutting-blade-for-replacement holding step, first, the replacement apparatus 100 is moved by the raising-lowering mechanism 86 and the multi-joint arm 90 (see FIG. 4 and FIG. 5) and is disposed above the placement part 202 held by the cover 78 or the like. Furthermore, the frame body 110 is rotated by the rotation mechanism 104 (see FIG. 6 and so forth) and the holding part 150B is made opposed to the placement surface 202a of the placement part 202. Next, the replacement apparatus 100 is lowered and the holding part 150B is brought into contact with the cutting blade 36 for replacement stored in the blade storing part 204A. Then, the cutting blade 36 for replacement is held under suction by the holding part 150B. Thereafter, the replacement apparatus 100 is raised and the holding part 150B is moved in such a direction as to get further away from the placement surface 202a of the placement part 202. Thereby, the cutting blade 36 for replacement is lifted up by the holding part 150B.

Figure 11B:
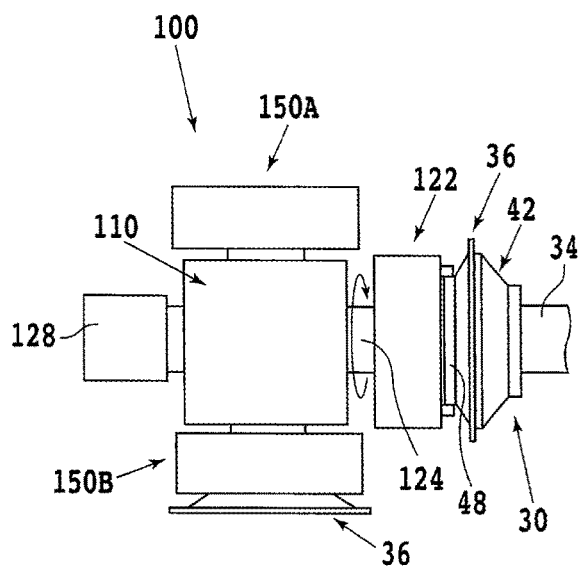
FIG. 11B is a schematic diagram illustrating the replacement apparatus in a nut removal step.

Next, the nut 48 mounted on the mount flange 42 of the cutting unit 30 is removed from the mount flange 42 (nut removal step). FIG. 11B is a schematic diagram illustrating the replacement apparatus 100 in the nut removal step. In the nut removal step, first, the replacement apparatus 100 is moved by the raising-lowering mechanism 86 and the multi-joint arm 90 (see FIG. 4 and FIG. 5), and the replacement apparatus 100 is disposed in the processing chamber 28 (see FIG. 1). Furthermore, the nut holding part 122 of the replacement apparatus 100 is made opposed to the mount flange 42 in the state in which the cutting blade 36 and the nut 48 are mounted thereon. Then, the nut 48 mounted on the mount flange 42 is held by the nut holding part 122 and is rotated. Specifically, in the state in which the nut 48 is grasped by the plural grasping components 134 (see FIG. 6 and so forth), the nut 48 is rotated in the first direction (such a direction as to loosen the nut 48) by rotating the rotating component 130 (see FIG. 6 and so forth) by the rotational drive source 128. As a result, the nut 48 loosens and is removed from the mount flange 42.

Figure 11C:
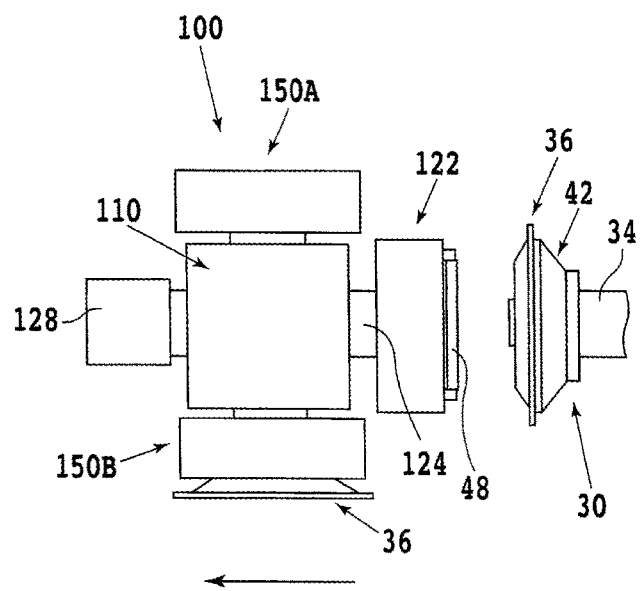
FIG. 11C is a schematic diagram illustrating the replacement apparatus in a first evacuation step.

Next, the nut holding part 122 and the mount flange 42 are separated (first evacuation step). FIG. 11C is a schematic diagram illustrating the replacement apparatus 100 in the first evacuation step. In the first evacuation step, the replacement apparatus 100 is moved toward the opposite side to the mount flange 42 by the multi-joint arm 90 (see FIG. 4 and FIG. 5). Thereby, the nut holding part 122 moves in such a direction as to get further away from the mount flange 42 in the state in which the nut holding part 122 holds the nut 48.

Figure 11D:
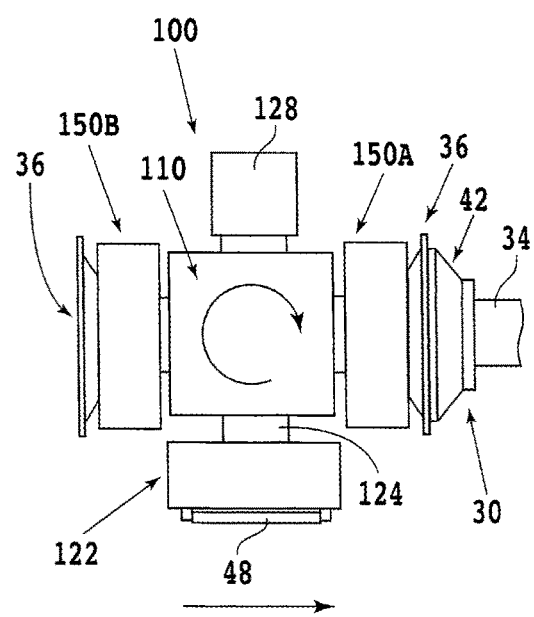
FIG. 11D is a schematic diagram illustrating the replacement apparatus in a used cutting blade holding step.

Next, the cutting blade 36 mounted on the mount flange 42 of the cutting unit 30 is held by the holding part 150A of the replacement apparatus 100 (used cutting blade holding step). FIG. 11D is a schematic diagram illustrating the replacement apparatus 100 in the used cutting blade holding step. In the used cutting blade holding step, first, the side of the front surface 150a (see FIG. 8A and so forth) of the holding part 150A is made opposed to the mount flange 42 by rotating the rotating part 106 (see FIG. 6 and so forth) of the rotation mechanism 104. Then, the replacement apparatus 100 is moved to the side of the mount flange 42 and the holding part 150A is brought into contact with the used cutting blade 36 mounted on the mount flange 42. Then, the used cutting blade 36 is held under suction by the holding part 150A.

Figure 12A:
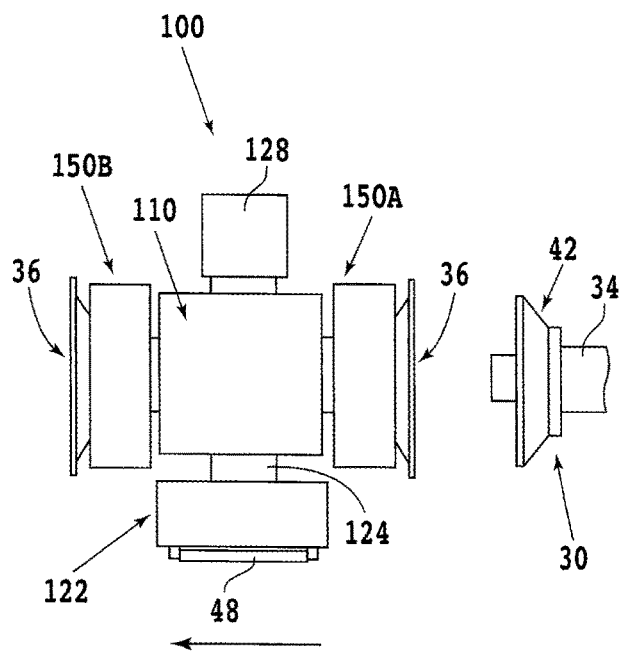
FIG. 12A is a schematic diagram illustrating the replacement apparatus in a second evacuation step.

Next, the holding part 150A and the mount flange 42 are separated (second evacuation step). FIG. 12A is a schematic diagram illustrating the replacement apparatus 100 in the second evacuation step. In the second evacuation step, the replacement apparatus 100 is moved toward the opposite side to the mount flange 42 by the multi-joint arm 90 (see FIG. 4 and FIG. 5). Thereby, the holding part 150A moves in such a direction as to get further away from the mount flange 42 in the state in which the holding part 150A holds the used cutting blade 36, so that the used cutting blade 36 is removed from the mount flange 42.

Figure 12B:
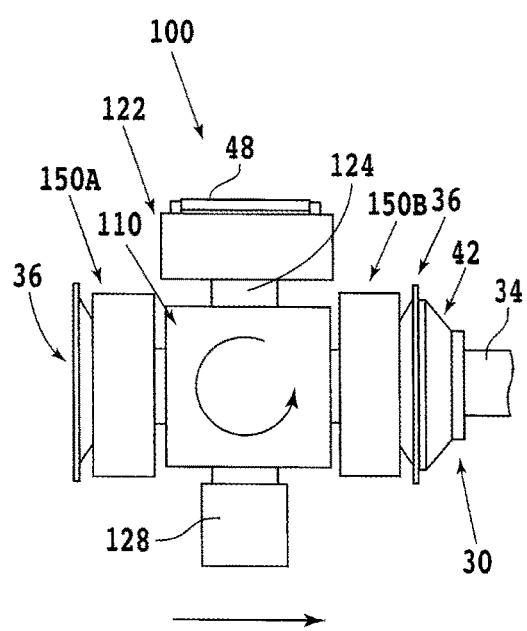
FIG. 12B is a schematic diagram illustrating the replacement apparatus in a cutting blade mounting step.

Next, the cutting blade 36 for replacement held by the holding part 150B of the replacement apparatus 100 is mounted on the mount flange 42 (cutting blade mounting step). FIG. 12B is a schematic diagram illustrating the replacement apparatus 100 in the cutting blade mounting step. In the cutting blade mounting step, first, the side of the front surface 150a (see FIG. 8A and so forth) of the holding part 150B that holds the cutting blade 36 for replacement is made opposed to the mount flange 42 by rotating the rotating part 106 (see FIG. 6 and so forth) of the rotation mechanism 104. Then, the replacement apparatus 100 is moved to the side of the mount flange 42, and the cutting blade 36 for replacement is disposed in such a manner that the boss part 46 (see FIG. 2) of the mount flange 42 is inserted into the opening 36a (see FIG. 2) of the cutting blade 36 for replacement. When the suction holding of the cutting blade 36 for replacement by the holding part 150B is released in this state, the cutting blade 36 for replacement is mounted on the mount flange 42.

Figure 12C:
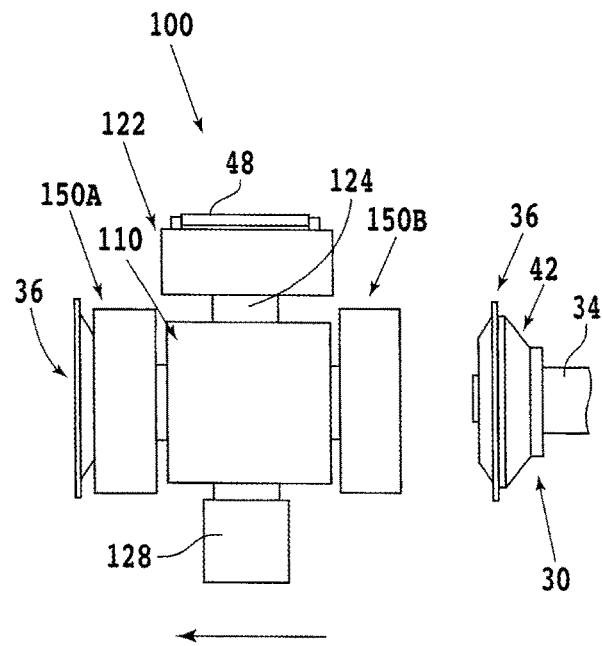
FIG. 12C is a schematic diagram illustrating the replacement apparatus in a third evacuation step.

Next, the holding part 150B and the mount flange 42 are separated (third evacuation step). FIG. 12C is a schematic diagram illustrating the replacement apparatus 100 in the third evacuation step. In the third evacuation step, the replacement apparatus 100 is moved toward the opposite side to the mount flange 42 by the multi-joint arm 90 (see FIG. 4 and FIG. 5). Thereby, the holding part 150B moves in such a direction as to get further away from the mount flange 42 and gets separated from the cutting blade 36 for replacement mounted on the mount flange 42.

Figure 12D:
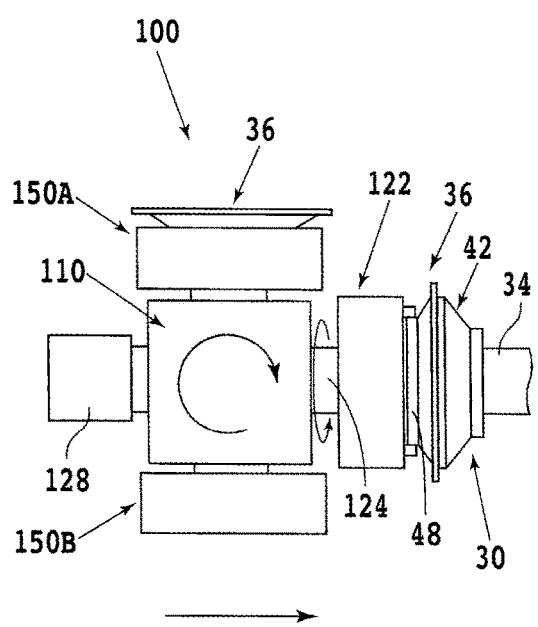
FIG. 12D is a schematic diagram illustrating the replacement apparatus in a nut mounting step.

Next, the nut 48 held by the nut holding part 122 is mounted on the mount flange 42 (nut mounting step). FIG. 12D is a schematic diagram illustrating the replacement apparatus 100 in the nut mounting step. In the nut mounting step, first, the nut holding part 122 that holds the nut 48 is made opposed to the mount flange 42 by rotating the rotating part 106 (see FIG. 6 and so forth) of the rotation mechanism 104. Furthermore, the replacement apparatus 100 is moved to the side of the mount flange 42 and the nut 48 is positioned to the tip part of the boss part 46 (see FIG. 2) of the mount flange 42. Then, the nut 48 grasped by the plural grasping components 134 (see FIG. 6 and so forth) is rotated in the second direction (such a direction as to fasten the nut 48) by rotating the rotating component 130 (see FIG. 6 and so forth) by the rotational drive source 128. As a result, the nut 48 is fastened to the boss part 46 (see FIG. 2) of the mount flange 42 and is mounted on the mount flange 42. Thereby, the cutting blade 36 is clamped by the mount flange 42 and the nut 48 and is fixed to the tip part of the spindle 34.

By the above procedure, replacement of the cutting blade 36 mounted on the mount flange 42 is executed. Then, the used cutting blade 36 held by the holding part 150A is placed in the blade storing part 204A of the stock unit 200. In the above-described steps, approximation and separation between the mount flange 42 and the replacement apparatus 100 may be executed by moving the cutting unit 30 (mount flange 42). For example, in the first evacuation step, the second evacuation step, and the third evacuation step, the replacement apparatus 100 and the mount flange 42 may be separated from each other by causing the cutting unit 30 to move along the Y-axis direction in such a manner as to get further away from the replacement apparatus 100.

Furthermore, although replacement of the cutting blade 36 mounted on the mount flange 42 has been explained in the above description, replacement of the cutting blade 52 (see FIG. 3) mounted on the mount flange 54 is also executed by a similar procedure. However, when the cutting blade 52 is replaced, the base 62 is held by the holding parts 150A and 150B together with the cutting blade 52 (see FIG. 9B) as described above. That is, replacement of the cutting blade 52 and the base 62 is executed instead of the above-described replacement of the cutting blade 36.

Moreover, in a case of replacing the cutting blade 52, in the cutting-blade-for-replacement holding step, the cutting blade 52 is held by the holding part 150B after the base 62 is held by the holding part 150B. Specifically, first, the holding part 150B is made opposed to the base 62 stored in the base storing part 206 (see FIG. 10A) and the base 62 is held by the holding part 150B. Next, the holding part 150B in the state of holding the base 62 is made opposed to the cutting blade 52 for replacement stored in the blade storing part 204B (see FIG. 10A), and the cutting blade 52 is held by the holding part 150B. At this time, the cutting blade 52 is held by the negative pressure of the suction source 160 that acts on the cutting blade 52 through the through-holes 62d (see FIG. 9B) formed in the base 62.

As described above, the replacement apparatus 100 can replace the used cutting blade 36 or 52 mounted on the cutting unit 30 with the cutting blade 36 or 52 for replacement stored in the blade storing part 204 (see FIG. 10A). This can automate replacement work of the cutting blades 36 and 52.

Furthermore, in addition to the replacement of the cutting blade 36 or 52, the replacement apparatus 100 can execute also replacement of the used board 19 or 21 placed on the chuck table 22 or the chuck table 26 (see FIG. 1) with the board 19 or 21 for replacement stored in the board storing part 208 or 210 (see FIG. 10A). Operation of the holding parts 150A and 150B when the board 19 or 21 is replaced will be described below.

The board 19 is cut by the cutting blade 36 or 52 in the state of being held by the chuck table 22 or the chuck table 26. Thereby, dressing of the cutting blade 36 or 52 is executed. Similarly, the board 21 is cut by the cutting blade 36 or 52 in the state of being held by the chuck table 22 or the chuck table 26. Then, inspection of the cutting blade 36 or 52 is executed on the basis of a groove formed in the board 21. When dressing of the cutting blades 36 and 52 is executed by using the board 19, grooves are formed in the board 19. Furthermore, when the grooves are formed across the whole of the board 19, the used board 19 is replaced with the board 19 for replacement (unused board 19). Similarly, the board 21 used for inspection of the cutting blades 36 and 52 is also replaced with the board 21 for replacement (unused board 21) at a predetermined timing.

Figure 13A:
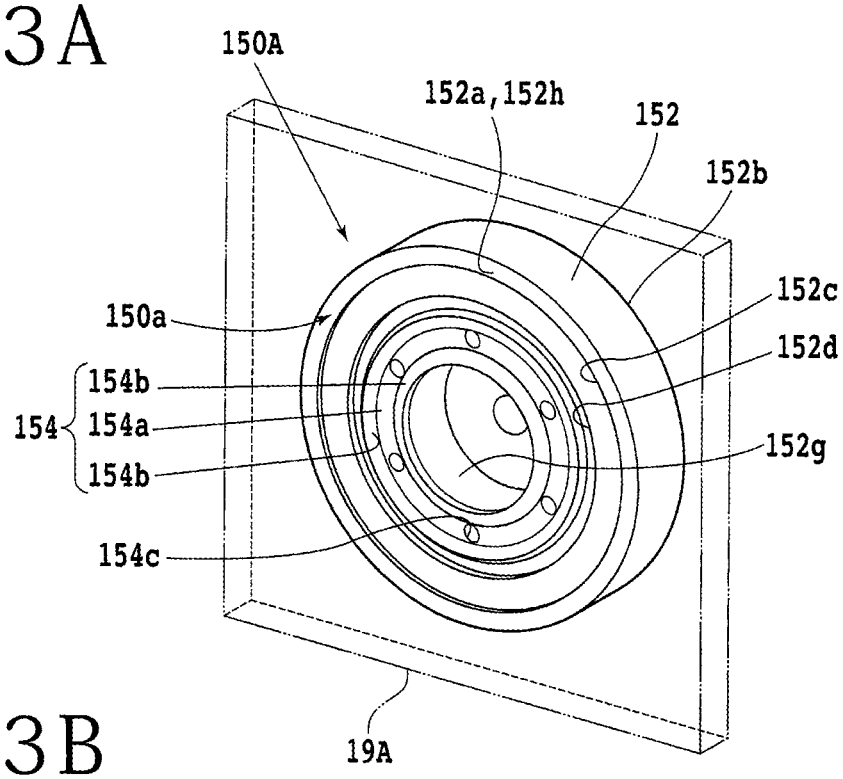
FIG. 13A is a perspective view illustrating the holding part that holds a large-size board.
Figure 13B:
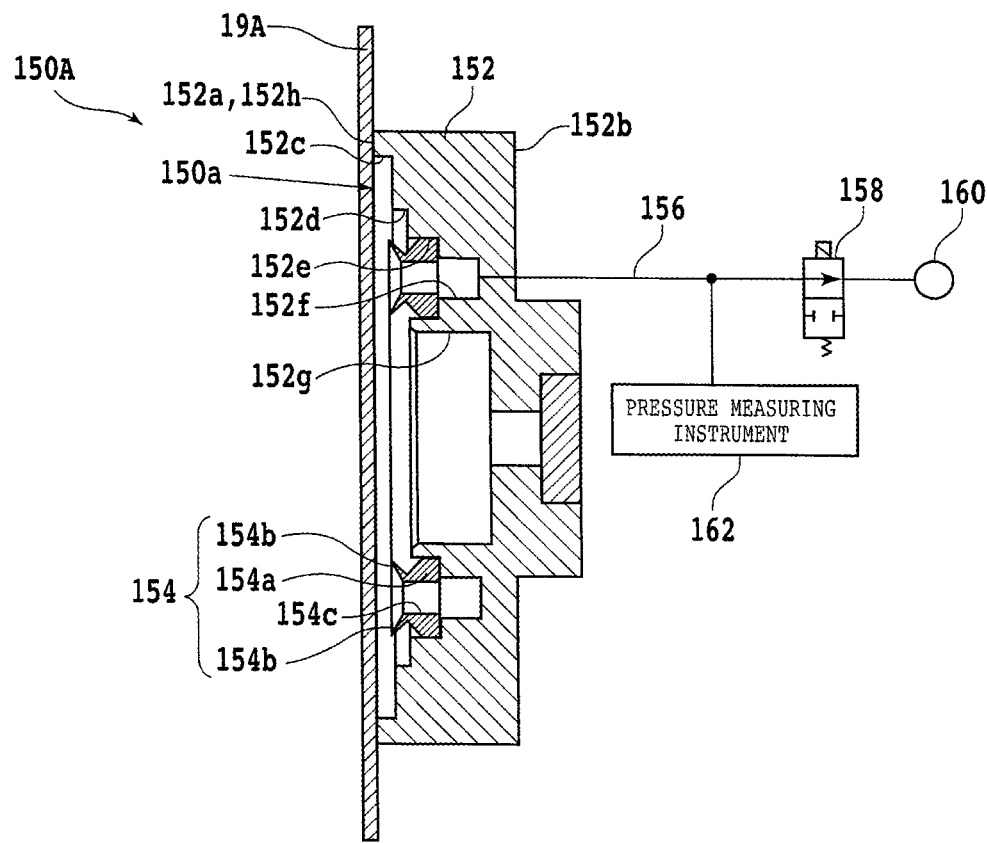
FIG. 13B is a sectional view illustrating the holding part that holds the large-size board.

Here, the holding parts 150A and 150B of the replacement apparatus 100 can hold not only the cutting blades 36 and 52 but also plate-shaped components such as the boards 19 and 21. Furthermore, replacement of the boards 19 and 21 is executed by the replacement apparatus 100. FIG. 13A is a perspective view illustrating the holding part 150A that holds a board 19A. FIG. 13B is a sectional view illustrating the holding part 150A that holds the board 19A. The board 19A is the large-size board 19 having such a shape and size as to enable covering of the whole of the front surface 150a of the holding part 150A (front surface 152a of the frame body 152). For example, the board 19A is formed into a rectangular shape, and the length and the width of the board 19A are equal to or larger than the diameter of the frame body 152. In FIG. 13A, only the contours of the board 19A are illustrated by two-dot chain lines for convenience of explanation.

The region outside the first groove 152c in the radial direction in the front surface 152a of the frame body 152 forms a board support part (board support surface) 152h that supports the board 19A. The board support part 152h is an annular flat surface substantially parallel to the radial direction of the frame body 152. When the board 19A is held by the holding part 150A, the board 19A is in contact with the board support part 152h and is supported by the board support part 152h. As illustrated in FIG. 13B, the board support part 152h protrudes to the outside of the holding part 150A relative to the tip of the blade suction pad 154 (tips of the pair of lip parts 154b). Specifically, the board support part 152h is disposed closer to the side of the front surface 150a of the holding part 150A than the tip of the blade suction pad 154 in the thickness direction of the frame body 152 (left-right direction in FIG. 13B). Furthermore, the board support part 152h is disposed outside the blade suction pad 154 in the radial direction.

When the board 19A is held by the holding part 150A, the holding part 150A is disposed in such a manner that the whole of the board support part 152h gets contact with the board 19A. Due to this, the first groove 152c is covered and closed by the board 19A. As a result, the inside of the frame body 152 (first groove 152c, second groove 152d, third groove 152e, suction path 152f, fourth groove 152g) is sealed. At this time, the board 19A is not in contact with the blade suction pad 154 (see FIG. 13B). When the valve 158 is opened and the negative pressure of the suction source 160 is caused to act on the suction path 152f in this state, the pressure of the inside of the frame body 152 is reduced and the board 19A is held under suction by the holding part 150A. Furthermore, the board 19A is supported by the board support part 152h in the state of being not in contact with the blade suction pad 154 (non-contact suction).

Figure 14A:
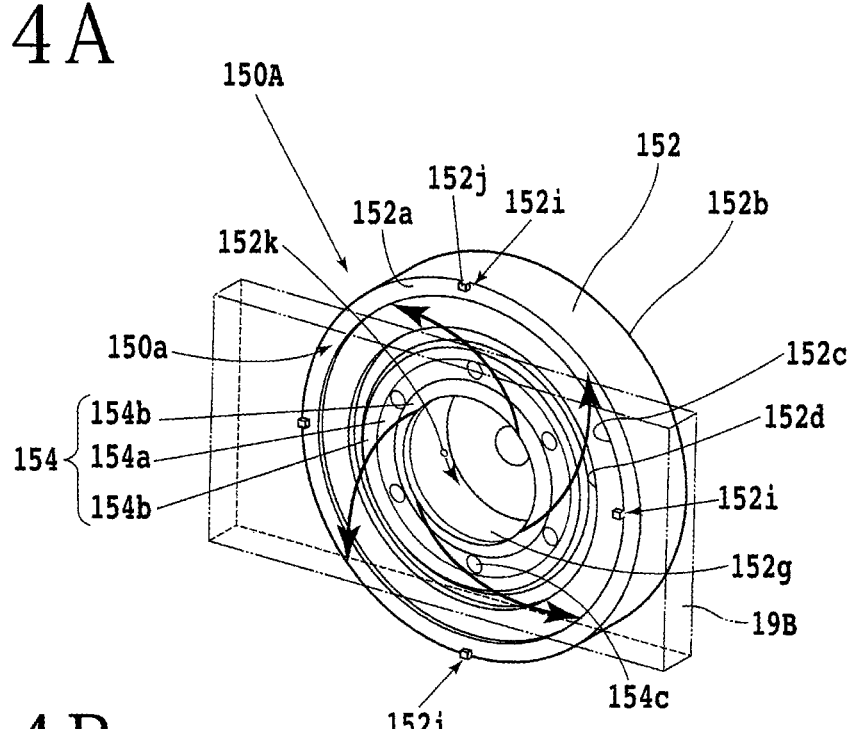
FIG. 14A is a perspective view illustrating the holding part that holds a small-size board.
Figure 14B:
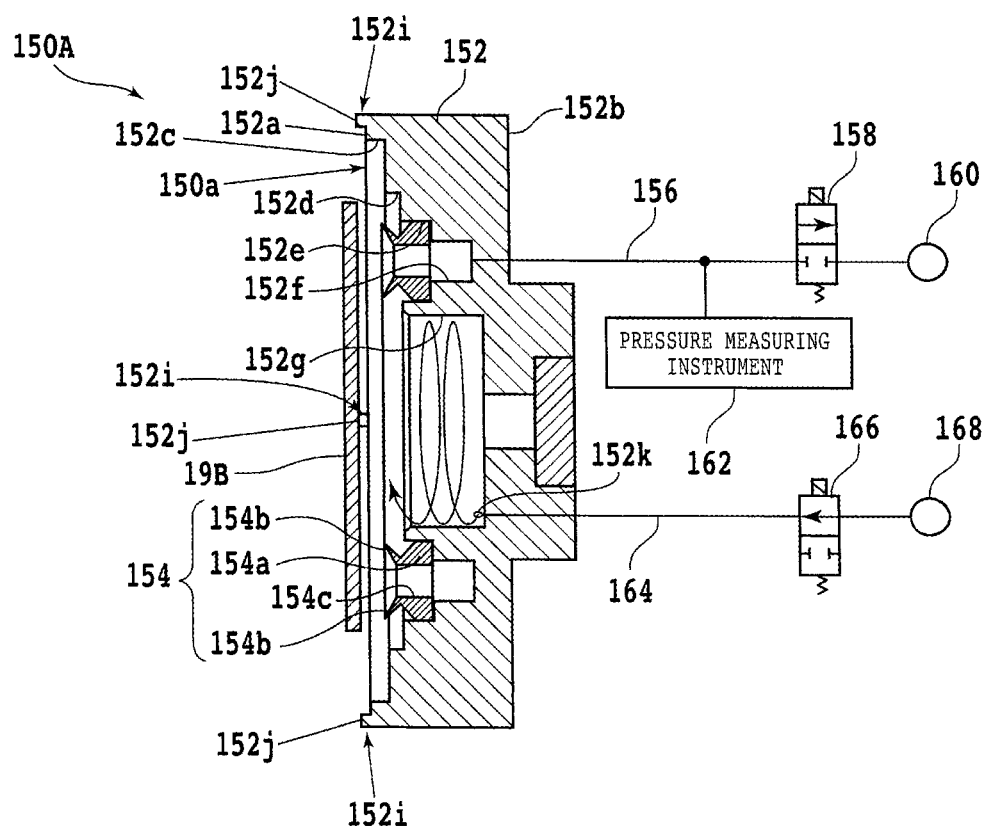
FIG. 14B is a sectional view illustrating the holding part that holds the small-size board.

The board that can be held by the holding part 150A is not limited to the above-described board 19A. FIG. 14A is a perspective view illustrating the holding part 150A that holds a board 19B. FIG. 14B is a sectional view illustrating the holding part 150A that holds the board 19B. The board 19B is the small-size board 19 having such a shape and size as to enable covering of only part of the front surface 150a of the holding part 150A (front surface 152a of the frame body 152). For example, the board 19B is formed into a rectangular shape, and the length of the board 19B is equal to or longer than the diameter of the frame body 152 and the width of the board 19B is smaller than the diameter of the first groove 152c of the frame body 152. In FIG. 14A, the contours of the board 19B are illustrated by two-dot chain lines for convenience of explanation.

In a case of holding the board 19B by the holding part 150A, plural protruding parts (protrusions) 152i are disposed on the side of the front surface 152a of the frame body 152. The plural protruding parts 152i are formed to protrude from the front surface 152a of the frame body 152 and are arranged at substantially equal intervals along the circumferential direction of the frame body 152. Furthermore, the tip surfaces of the protruding parts 152i configure board support parts (board support surfaces) 152j that are formed substantially in parallel to the front surface 152a of the frame body 152 and hold the board 19B. Although the example in which four protruding parts 152i are disposed on the frame body 152 is illustrated in FIG. 14A, there is no limit on the number of protruding parts 152i.

When the board 19B is held by the holding part 150A, the holding part 150A is disposed in such a manner that the board support parts 152j of the plural protruding parts 152i get contact with the board 19B. At this time, the board 19B is not in contact with the front surface 152a of the frame body 152, and thus the first groove 152c is not closed by the board 19B. Therefore, the inside of the frame body 152 (first groove 152c, second groove 152d, third groove 152e, suction path 152f, fourth groove 152g) is not sealed.

Furthermore, the holding part 150A holds the board 19B by using the Bernoulli effect. Specifically, a gas supply path 152k to which gas such as air is supplied is made in the holding part 150A. For example, the gas supply path 152k is formed in such a manner that one end side is opened inside the fourth groove 152g. In addition, one end side of a flow path 164 configured by a tube, pipe, or the like is connected to the other end side of the gas supply path 152k. The other end side of the flow path 164 is connected to a gas supply source 168 through a valve 166. For example, the valve 166 is configured by a solenoid valve in which opening and closing are electrically controlled. Furthermore, the gas supply source 168 supplies gas such as air to the flow path 164 at a predetermined flow rate. When the valve 166 is opened, the gas is supplied from the gas supply source 168 to the gas supply path 152k through the flow path 164, and the gas is jetted from the gas supply path 152k to the inside of the fourth groove 152g. The gas supply path 152k is formed to be inclined with respect to the radial direction of the inner wall of the fourth groove 152g. Thus, the gas jetted from the gas supply path 152k flows to swirl while colliding with the inner wall of the fourth groove 152g. Due to this, a swirl flow is generated inside the frame body 152. Then, the gas flows in a spiral manner toward the side of the front surface 152a while spreading in the radial direction of the frame body 152 and is jetted toward the external from the gap between the front surface 152a of the frame body 152 and the board 19B.

Due to the swirl flow generated inside the frame body 152, the pressure at the central part of the inside of the frame body 152 lowers in accordance with the Bernoulli's principle. Due to this, the central part of the board 19B is attracted toward the inside of the frame body 152, and the board 19B is held under suction by the holding part 150A. At this time, the board 19B is supported by the plural board support parts 152j in the state of being not in contact with the blade suction pad 154 (non-contact suction). Furthermore, rotation of the board 19B attributed to collision of the swirl flow with the board 19B is prevented by friction that acts between the board 19B and the board support parts 152j.

As described above, making the gas supply path 152k makes it possible to hold the small-size board 19 incapable of covering the whole of the front surface 150a of the holding part 150A. There is no limit on the number of gas supply paths 152k made in the frame body 152. For example, plural gas supply paths 152k opened at substantially equal intervals along the circumferential direction of the inner wall of the fourth groove 152g may be made in the frame body 152.

Furthermore, although the cases in which the boards 19A and 19B are held by the holding part 150A have been explained in the above description, the holding part 150B (see FIG. 6 and so forth) can also hold the boards 19A and 19B similarly. Moreover, the holding parts 150A and 150B can each hold the boards 21 (see FIG. 10A) with various sizes similarly to the boards 19A and 19B.

Here, dust (cutting dust) generated when cutting is executed by the cutting blade 36 or 52 adheres to the used boards 19 and 21 in many cases. For this reason, if the board 19 or 21 gets contact with the blade suction pad 154, the cutting dust adheres to the blade suction pad 154 and contamination or deterioration of the blade suction pad 154 is likely to occur. Furthermore, grooves are formed in the used boards 19 and 21 by the cutting blades 36 and 52, and recesses and protrusions exist in the surfaces of the boards 19 and 21. Moreover, the board 19 contains the abrasive grains, and minute recesses and protrusions are formed due to the abrasive grains exposed from the binder in the surface of the board 19. For this reason, if the board 19 or 21 gets contact with the blade suction pad 154, wear or damage of the blade suction pad 154 is likely to occur due to the recesses and protrusions of the board 19 or 21. However, when the holding parts 150A and 150B are used, in holding of the board 19 or 21, the board 19 or 21 is supported by the board support part 152h or 152j and does not get contact with the blade suction pad 154 (see FIG. 13B and FIG. 14B). Due to this, contamination and damage of the blade suction pad 154 are prevented, and the blade suction pad 154 is kept at the state of being capable of properly holding the cutting blade 36 or 52.

In a case of holding the board 19A (see FIG. 13A and FIG. 13B) by the holding part 150A or 150B in which the gas supply path 152k (see FIGS. 14A and 14B) is made, it is also possible to assist release of the holding of the board 19A by jetting gas from the gas supply path 152k. Specifically, in the state in which the board 19A held by the holding part 150A or 150B is disposed at a desired position, the valve 158 is closed to release the suction of the board 19A by the blade suction pad 154. In addition, the valve 166 is opened to jet the gas from the gas supply path 152k toward the board 19A. Thereby, the board 19A is pushed toward such a direction as to get separated from the holding part 150A or 150B and separation of the board 19A from the blade suction pad 154 is facilitated.

Next, a specific example of a board replacement method using the replacement apparatus 100 will be described. In the following, as one example, the case in which the board 19 placed on the chuck table 26 is replaced will be described.

First, the board 19 for replacement is placed over the placement surface 202a of the placement part 202 included in the stock unit 200 (see FIG. 10A) (preparation step). Specifically, the board 19 for replacement (unused board 19) is housed in the board storing part 208 fixed onto the placement surface 202a of the placement part 202. The stock unit 200 restocked with the board 19 for replacement is housed in the container 8 (see FIG. 1). Then, the stock unit 200 is drawn out from the container 8 by the first conveying unit 72 and is conveyed onto the cover 78 in the closed state. Thereby, the board 19 for replacement is prepared over the cover 78. The stock unit 200 may be disposed on the pair of guide rails 16 or on the chuck table 22.

Figure 15A:
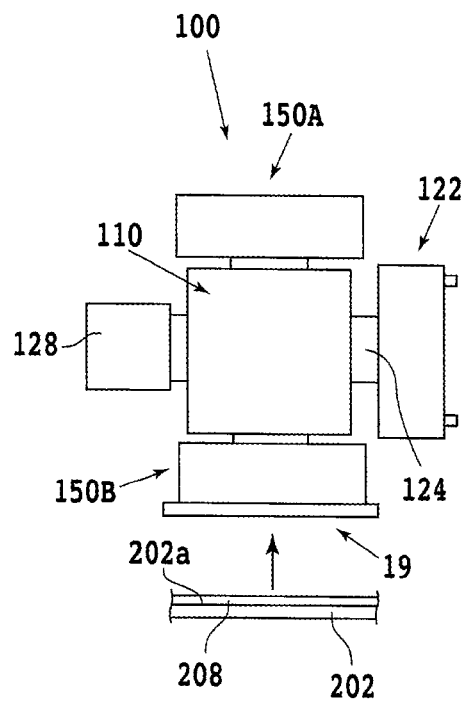
FIG. 15A is a schematic diagram illustrating the replacement apparatus in a board-for-replacement holding step.

Next, the board 19 for replacement placed over the placement surface 202a of the placement part 202 is held by the holding part 150B of the replacement apparatus 100 (board-for-replacement holding step). FIG. 15A is a schematic diagram illustrating the replacement apparatus 100 in the board-for-replacement holding step. In the board-for-replacement holding step, first, the replacement apparatus 100 is moved by the raising-lowering mechanism 86 and the multi-joint arm 90 (see FIG. 4 and FIG. 5) and is disposed above the placement part 202 held by the cover 78 or the like. Furthermore, the frame body 110 is rotated by the rotation mechanism 104 (see FIG. 6 and so forth), and the holding part 150B is made opposed to the placement surface 202a of the placement part 202. Next, the replacement apparatus 100 is lowered, and the holding part 150B is brought into contact with the board 19 for replacement disposed over the placement surface 202a of the placement part 202. Then, the board 19 for replacement is held under suction by the holding part 150B.

When the board 19 for replacement can cover the whole of the board support part 152h of the holding part 150B, the board 19 for replacement is held by the suction force of the suction source 160 (see FIG. 13A and FIG. 13B). On the other hand, when the board 19 for replacement cannot cover the whole of the board support part 152h of the holding part 150B, gas is supplied from the gas supply source 168 to the gas supply path 152k, and the board 19 for replacement is held by the Bernoulli effect (see FIG. 14A and FIG. 14B). Thereafter, the replacement apparatus 100 is raised and the holding part 150B is moved in such a direction as to get further away from the placement surface 202a of the placement part 202. Thereby, the board 19 for replacement is lifted up by the holding part 150B.

Figure 15B:
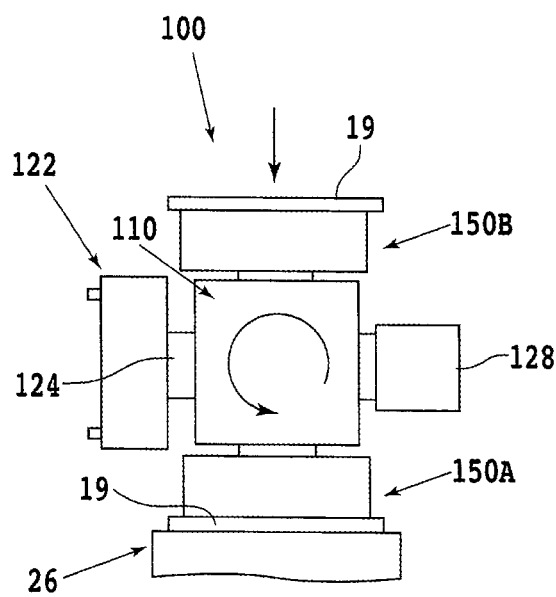
FIG. 15B is a schematic diagram illustrating the replacement apparatus in a used board holding step.

Next, the used board 19 held by the chuck table 26 is held by the holding part 150A of the replacement apparatus 100 (used board holding step). FIG. 15B is a schematic diagram illustrating the replacement apparatus 100 in the used board holding step. In the used board holding step, first, the replacement apparatus 100 is moved by the raising-lowering mechanism 86 and the multi-joint arm 90 (see FIG. 4 and FIG. 5), and the replacement apparatus 100 is disposed above the chuck table 26 on which the used board 19 is disposed. Furthermore, the holding part 150A is made opposed to the chuck table 26 by rotating the rotating part 106 (see FIG. 6 and so forth) of the rotation mechanism 104. Then, the replacement apparatus 100 is moved to the side of the chuck table 26, and the holding part 150A is brought into contact with the used board 19 held by the chuck table 26. Then, the used board 19 is held under suction by the holding part 150A.

When the used board 19 can cover the whole of the board support part 152h of the holding part 150A, the used board 19 is held by the suction force of the suction source 160 (see FIG. 13A and FIG. 13B). On the other hand, when the used board 19 cannot cover the whole of the board support part 152h of the holding part 150A, gas is supplied from the gas supply source 168 to the gas supply path 152k, and the used board 19 is held by the Bernoulli effect (see FIG. 14A and FIG. 14B).

Figure 15C:
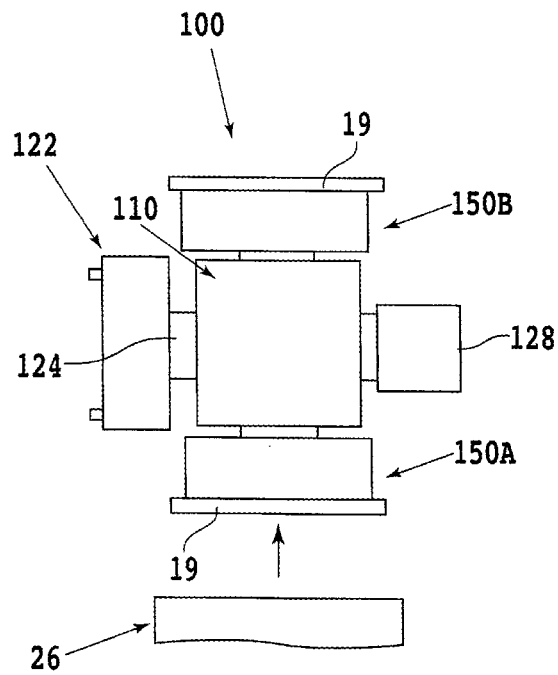
FIG. 15C is a schematic diagram illustrating the replacement apparatus in an evacuation step.

Next, the holding part 150A and the chuck table 26 are separated (evacuation step). FIG. 15C is a schematic diagram illustrating the replacement apparatus 100 in the evacuation step. In the evacuation step, the replacement apparatus 100 is raised by the raising-lowering mechanism 86 (see FIG. 4 and FIG. 5) and is moved toward the opposite side to the chuck table 26. Thereby, the holding part 150A moves in such a direction as to get further away from the chuck table 26 in the state in which the holding part 150A holds the used board 19, so that the used board 19 is lifted up.

Figure 15D:
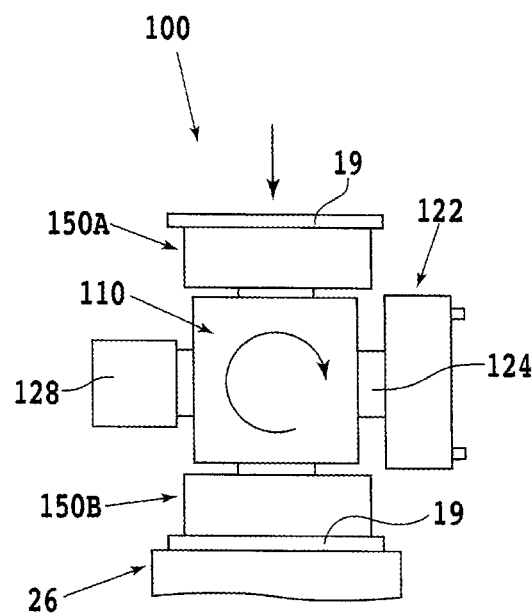
FIG. 15D is a schematic diagram illustrating the replacement apparatus in a placement step.

Next, the board 19 for replacement held by the holding part 150B of the replacement apparatus 100 is placed on the chuck table 26 (placement step). FIG. 15D is a schematic diagram illustrating the replacement apparatus 100 in the placement step. In the placement step, first, the holding part 150B that holds the board 19 for replacement is made opposed to the chuck table 26 by rotating the rotating part 106 (see FIG. 6 and so forth) of the rotation mechanism 104. Then, the replacement apparatus 100 is moved to the side of the chuck table 26, and the board 19 for replacement is positioned on the chuck table 26. Thereafter, when the suction holding of the board 19 for replacement by the holding part 150B is released, the board 19 for replacement is placed on the chuck table 26.

By the above procedure, replacement of the board 19 disposed on the chuck table 26 is executed. Then, the used board 19 held by the holding part 150A is placed in the board storing part 208 of the stock unit 200. Although replacement of the board 19 has been explained in the above description, replacement of the board 21 can also be executed by the same procedure in the case in which the board 21 is placed on the chuck table 26.

Furthermore, in the above description, explanation has been made about the example in which the stock unit 200 (see FIG. 10A) including the placement part 202 over which various implements used in the cutting apparatus 2 (cutting blades 36 and 52, base 62, boards 19 and 21, and so forth) are placed is housed in the container 8 (see FIG. 1) and is conveyed onto the cover 78 (see FIG. 1) or the like. However, the form of the storing of the cutting blades 36 and 52 and so forth is not limited thereto.

Figure 16:
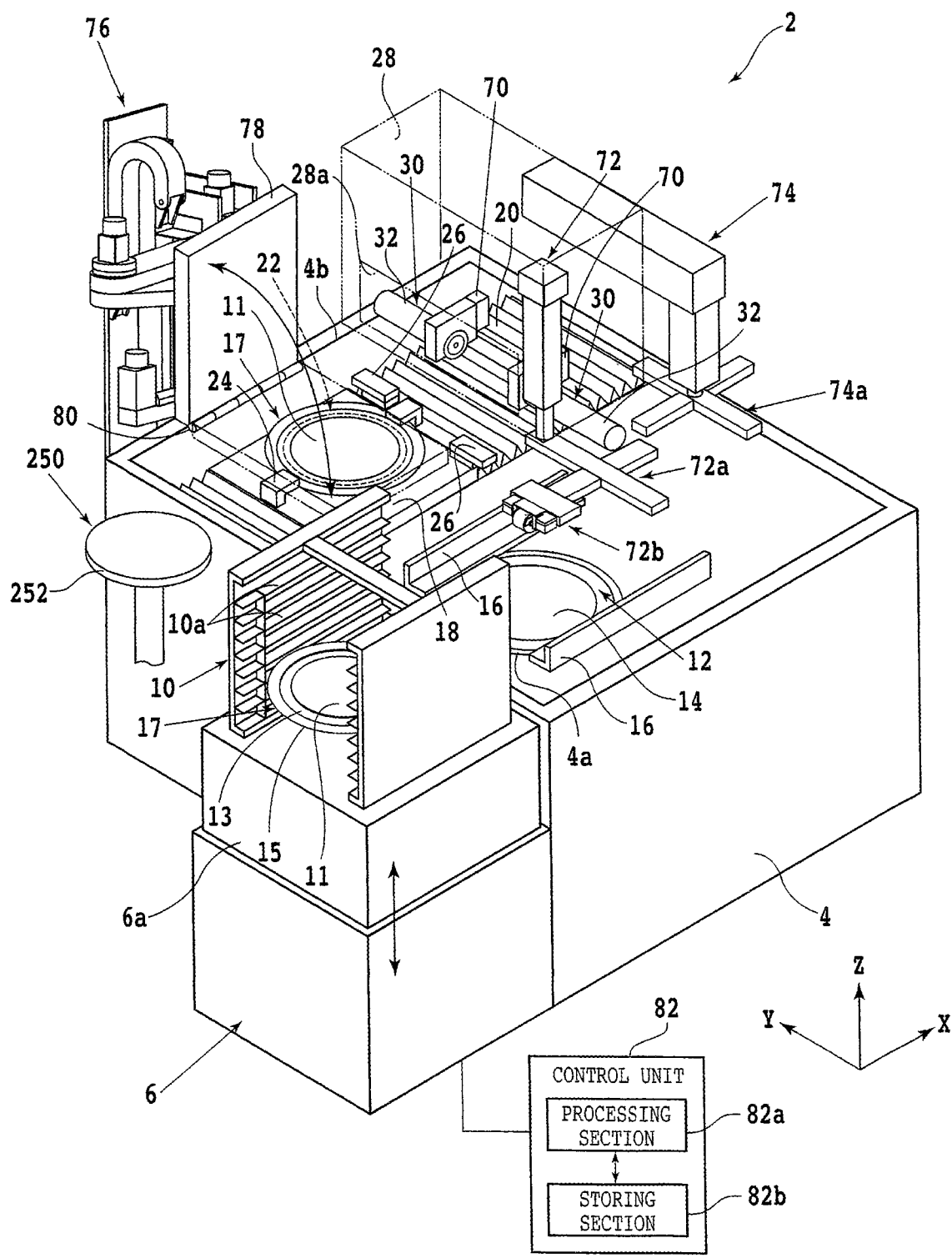
FIG. 16 is a perspective view illustrating the cutting apparatus in which a stock unit is installed.

FIG. 16 is a perspective view illustrating the cutting apparatus 2 in which a stock unit 250 is installed. The cutting apparatus 2 illustrated in FIG. 16 includes the stock unit 250 that is disposed near the replacement unit 76 and stores various implements used in the cutting apparatus 2 instead of the container 8 (see FIG. 1). For example, the stock unit 250 is disposed in a region adjacent to the opening 4b of the base 4. The stock unit 250 stores implements such as the cutting blades 36 and 52, the base 62, and the boards 19 and 21 (see FIG. 10A) used in the cutting apparatus 2. Specifically, the stock unit 250 includes a rotary placement part (placement base) 252 over which various implements are placed.

Figure 17:
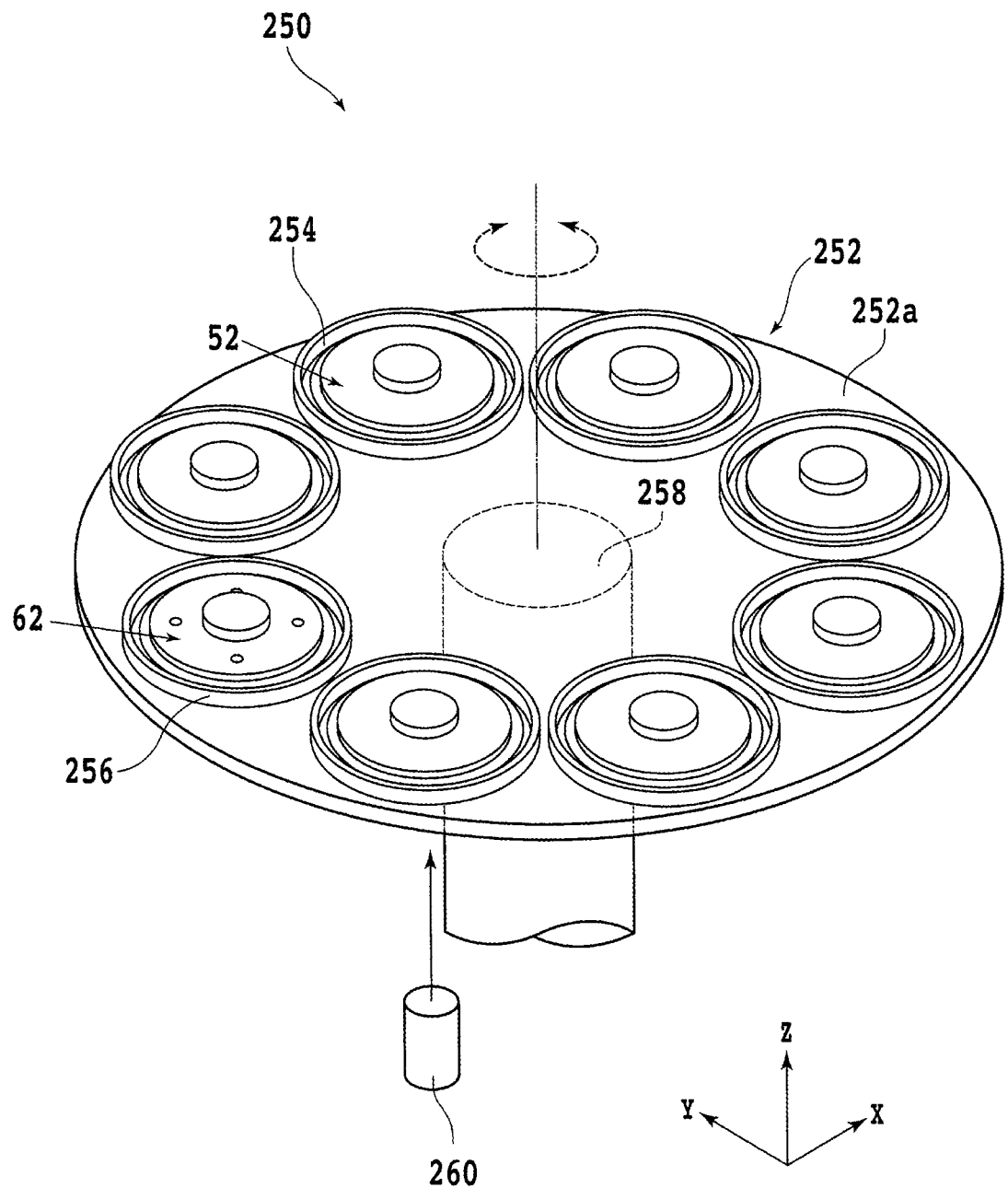
FIG. 17 is a perspective view illustrating the stock unit including a rotary placement part.

FIG. 17 is a perspective view illustrating the stock unit 250 including the rotary placement part 252. For example, the placement part 252 is a plate-shaped component formed into a circular disc shape and the upper surface of the placement part 252 forms a flat placement surface 252a over which various implements are placed. The cutting blades and so forth are placed over the placement surface 252a of the placement part 252. In FIG. 17, as one example, the case in which the cutting blades 52 and the base 62 are placed over the placement surface 252a of the placement part 252 is illustrated.

Plural blade storing parts 254 that store the cutting blade 52 and a pressing flange storing part 256 that stores the base 62 are fixed onto the placement surface 252a of the placement part 252. The configurations of the blade storing part 254 and the pressing flange storing part 256 are the same as the blade storing part 204 and the base storing part 206, respectively, illustrated in FIG. 10A. The blade storing parts 254 and the pressing flange storing part 256 are disposed at substantially equal intervals along the circumferential direction of the placement part 252.

A rotating part (shaft) 258 that rotates by power transmitted from a rotational drive source (not illustrated) such as a motor is coupled to the lower surface side of the central part of the placement part 252. When the rotating part 258 is rotated by the rotational drive source, the placement part 252 rotates around a rotation axis substantially parallel to the Z-axis.

A reading unit 260 that reads identification marks given to the cutting blades 52 and so forth is disposed on the lower side of the placement part 252. For example, the cutting blade 52 is given an identification mark (see the identification mark 212 in FIG. 10B) including information relating to the cutting blade 52. Furthermore, the cutting blade 52 is housed in the blade storing part 254 in such a manner that the surface given the identification mark is opposed to the placement surface 252a.

The reading unit 260 is configured by a visible light camera, infrared camera, or the like, for example, and reads the identification mark given to the cutting blade 52 through the placement part 252 and the blade storing part 254. Thus, the materials of the placement part 252 and the blade storing part 254 are selected according to the kind of reading unit 260. For example, when the reading unit 260 is a visible light camera, the whole or part of the placement part 252 and the blade storing part 254 is configured by a component through which visible light is transmitted. Specifically, as the placement part 252, a substrate composed of a transparent body such as plastic or glass (for example, quartz glass, borosilicate glass) can be used. Furthermore, as the blade storing part 254, a case composed of a transparent body such as plastic can be used. However, the materials of the placement part 252 and the blade storing part 254 can be changed as appropriate according to the kind of reading unit 260. For example, when the reading unit 260 is an infrared camera, the placement part 252 and the blade storing part 254 are configured by a component through which infrared is transmitted.

The reading unit 260 is disposed directly under one blade storing part 254. Then, the identification mark given to the cutting blade 52 stored in the blade storing part 254 disposed directly above the reading unit 260 is read by the reading unit 260. Furthermore, the blade storing part 254 disposed directly above the reading unit 260 can be changed by rotating the placement part 252. This makes it possible to read the identification mark given to the optional cutting blade 52 placed over the placement part 252. Information on the identification mark read by the reading unit 260 is output to the control unit 82 (see FIG. 16). The reading unit 260 may be disposed on the upper side of the placement part 252. In this case, the cutting blade 52 is housed in the blade storing part 254 in such a manner that the surface given the identification mark is exposed upward.

For example, when replacement of the cutting blade 52 is executed, the cutting blade 52 for replacement and the base 62 are prepared in the stock unit 250. Then, the replacement unit 76 holds the cutting blade 52 for replacement and the base 62 stored in the stock unit 250 by the replacement apparatus 100 (see FIG. 9B). At this time, the control unit 82 controls the replacement unit 76 on the basis of information included in the identification mark given to the cutting blade 52 and causes the replacement apparatus 100 to hold the predetermined cutting blade 52. This allows selection of the desired cutting blade 52 as the cutting blade 52 for replacement. Thereafter, the used cutting blade 52 and the base 62 mounted on the cutting unit 30 are replaced with the cutting blade 52 for replacement and the base 62 (see FIG. 11A to FIG. 12D).

The board storing parts 208 and 210 illustrated in FIG. 10A may be fixed onto the placement surface 252a of the placement part 252. In this case, the boards 19 and 21 for replacement are also stored in the stock unit 250. Furthermore, the replacement unit 76 can hold the board 19 or 21 for replacement stored in the stock unit 250 and replace the used board 19 or 21 placed on the chuck table 26 with the board 19 or 21 for replacement (see FIG. 15A to FIG. 15D).

As described above, the cutting apparatus 2 according to the present embodiment includes the replacement apparatus 100 that can replace the cutting blades 36 and 52 and the boards 19 and 21. This makes it possible to automatically execute not only replacement of the cutting blades 36 and 52 but also replacement of the boards 19 and 21, and replacement work of the boards 19 and 21 is made easy. Furthermore, the replacement apparatus 100 includes the holding parts 150A and 150B that can hold the cutting blades 36 and 52 and the boards 19 and 21. Due to this, the mechanism that holds the cutting blades 36 and 52 and the mechanism that holds the boards 19 and 21 do not need to be separately installed independently and increase in the size of the cutting apparatus 2 is suppressed. Moreover, the holding parts 150A and 150B included in the above-described replacement apparatus 100 can hold the boards 19 and 21 without causing the boards 19 and 21 to be in contact with the blade suction pad 154. Due to this, contamination and damage of the blade suction pad 154 are prevented.

Structures, methods, and so forth according to the above-described embodiment can be carried out with appropriate changes without departing from the range of the object of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A cutting apparatus that cuts a workpiece by a cutting blade, the cutting apparatus comprising:
   a chuck table that holds a board in which a groove is formed through cutting of the board by the cutting blade;
   a cutting unit having a spindle and a mount flange that is fixed to a tip part of the spindle and on which the cutting blade is mounted; and
   a replacement apparatus that replaces the cutting blade mounted on the mount flange with a cutting blade stored in a blade storer and further replaces the board placed on the chuck table with a board stored in a board storer,
   wherein the replacement apparatus includes a holding part that holds one at a time, under suction from a vacuum source, the cutting blade that was stored in the blade storer and the board that was stored in the board storer,
   wherein the holding part has a board support part that includes a first surface that supports and holds, under suction, the board that was stored in the board storer,
   wherein the holding part further has each of a first groove and a second groove formed therein, the first groove and the second groove being separated from one another so as to be disposed at different depths with respect to the first surface, wherein the holding part further has a blade suction pad,
the blade suction pad being seated within the second
groove and being connected to the vacuum source, wherein the blade suction pad contacts and holds, under
suction, the cutting blade that was stored in the blade
storer, wherein the board support part is disposed circumferentially about the first groove, and the board held under suction is supported by the board
support part in a state in which the board held under
suction is not in contact with the blade suction pad.

2. The cutting apparatus according to claim 1, wherein the holding part has a suction path that is connected to the vacuum source and the suction path communicates with a through-hole that is open toward the cutting blade or the board held by the holding part.

3. The cutting apparatus according to claim 1, wherein the replacement apparatus has two holding parts as the holding part, wherein one of the two holding parts holds the cutting
blade mounted on the mount flange or the board placed
on the chuck table, and the other of the two holding parts holds the cutting blade
that was stored in the blade storer or the board that was
stored in the board storer.

4. The cutting apparatus according to claim 1, wherein each cutting blade includes a respective annular held portion and a respective cutting edge formed at an outer circumferential part of the annular held portion, and the holding part holds the annular held portion under
suction through causing a negative pressure to act on
the annular held portion.

5. The cutting apparatus according to claim 1, wherein
the cutting apparatus further comprises a base which
includes each of a first surface, a second surface that
supports a given cutting blade, and a through-hole that
reaches the second surface from the first surface, and the holding part holds the base under suction through
causing a negative pressure to act on the first surface
and holds the given cutting blade under suction through
causing a negative pressure to act on the second surface
through the through-hole.

6. The cutting apparatus according to claim 1, wherein the holding part further includes a nut rotation part that rotates relative to the holding part.

7. The cutting apparatus according to claim 6, wherein the nut rotation part has a longitudinal axis that is transverse to a longitudinal axis of the holding part.

8. The cutting apparatus according to claim 1, wherein the blade suction pad includes a base part and spaced lips that protrude from the base part.

9. The cutting apparatus according to claim 1, wherein the holding part has a gas supply path that is connected to a gas supply source, and one side of the gas supply path is open toward the cutting blade or the board held by the holding part.

10. The cutting apparatus according to claim 1, wherein the board provides for dressing of the cutting blade when the groove is formed in the board through cutting of the board with the cutting blade.

* * * * *